(12) United States Patent
Kinzenbaw et al.

(10) Patent No.: US 6,494,154 B2
(45) Date of Patent: Dec. 17, 2002

(54) CENTRALIZED SEED DISTRIBUTION SYSTEM FOR PLANTER

(75) Inventors: Jon E. Kinzenbaw, Williamsburg, IA (US); Alan F. Barry, Fairfax, IA (US); Harry C. Deckler, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 0 days.

(21) Appl. No.: 09/903,038

(22) Filed: Jul. 11, 2001

(65) Prior Publication Data

US 2002/0043194 A1 Apr. 18, 2002

Related U.S. Application Data

(60) Provisional application No. 60/218,230, filed on Jul. 14, 2000.

(51) Int. Cl.$^7$ ............................................. A01B 73/04
(52) U.S. Cl. ........................................ 111/54; 172/311
(58) Field of Search ................................ 111/14, 18, 19, 111/20, 22, 24, 34, 52, 53, 54, 55, 63, 73, 186–189, 80, 170, 171, 200, 925

(56) References Cited

U.S. PATENT DOCUMENTS

| | | | | | |
|---|---|---|---|---|---|
| 2,176,528 A | * | 10/1939 | Gilchrist | ...................... | 111/52 |
| 2,721,525 A | * | 10/1955 | Northcote | ...................... | 111/54 |
| 3,411,467 A | * | 11/1968 | Van Der Lely et al. | ...... | 111/52 |
| 4,664,202 A | * | 5/1987 | Applequist et al. | ......... | 172/311 |
| 5,062,489 A | * | 11/1991 | Adee | ......................... | 172/311 |
| 5,829,370 A | * | 11/1998 | Bender | ......................... | 111/54 |
| 5,913,369 A | * | 6/1999 | Bodie et al. | ................. | 172/311 |
| 6,076,613 A | * | 6/2000 | Fraiser | ........................ | 172/311 |

* cited by examiner

Primary Examiner—Robert E. Pezzuto
(74) Attorney, Agent, or Firm—Emrich & Dithmar; James J. Hill, Esq.

(57) ABSTRACT

An agricultural planter having left and right hinged wing sections includes seed storage tanks carried by the planter frame and feeding individual row units, mounted fore and aft of the main toolbar, by flexible conduits. The tanks are mounted to permit the wings to flex independently to follow ground contour while extending the tanks from a wing section onto the center frame section.

25 Claims, 17 Drawing Sheets

CENTRALIZED SEED DISTRIBUTION SYSTEM FOR PLANTER

RELATED APPLICATIONS

This application, pursuant to 37 C.F.R. §1.78(c), claims priority based on U.S. provisional application Serial No. 60/218,230 filed on Jul. 14, 2000.

FIELD OF THE INVENTION

The present invention relates to agricultural planters. Although the illustrated embodiment is in the form of an agricultural row crop planter having multiple frame sections which are hinged together to permit the planter to follow ground contour more closely, the invention has application to single frame planters and to grain drills as well. A row crop planter deposits individual seeds in rows. Typically, a row crop planter has a plurality of "row units" which are independently mounted to a pull frame. Each row unit forms a furrow, deposits separated or "singulated" seeds at a fixed spacing along the furrow and closes the furrow, covering the seed and lightly packing the soil above the seed.

BACKGROUND OF THE INVENTION

A planter row unit, in addition to having a furrow opening device, a seed meter or "singulating" mechanism for separating and depositing individual seeds in the furrow, and a furrow closing device, also typically has a separate hopper (or small tank) to store a supply of seed. A hopper for a planter row unit typically holds about 120 pounds of seed which is generally delivered to the farmer in 50 lb. bags. Seed is stored in the hopper which supplies the seed meter. The seed, upon being singulated by the meter, flows under gravity through a rigid delivery tube into a formed furrow immediately behind a disc furrow opener. The number of acres a farmer may plant with such a system without stopping to refill the hoppers, for a given number of row units and equal seeding rates, is determined by the seed storage capacity of the individual hoppers on the row units.

All of the hoppers on a planter are not necessarily filled with equal amounts of seed. Thus, some row units will run out of seed before others. When a row unit hopper runs out of seed, the farmer is alerted by a monitor normally mounted within the operator's vision on the tractor which displays in real time the "population" or number of seeds being planted per linear unit of measure or per acre. Individual row units have their own sensors and if one row unit runs out of seed, the farmer is alerted immediately. Even though other planter row units may still have seed, the farmer must stop planting and refill all the tanks to reduce the number of stops.

A modern row crop planter may have twelve, sixteen, eighteen or twenty-four row units. It is a very strenuous task to load eighteen empty or nearly empty hoppers using 50 lb. seed bags in the field. The seed bags must be lifted by hand, normally from a pick-up truck, carried to a particular row in the planter; and the farmer must then negotiate between adjacent row units, carrying the seed bag at approximately shoulder level, maneuver the seed bag over the hoppers and dump the seed into the hopper. It frequently happens that the farmer fills one hopper and still may have twenty to forty pounds of seed remaining in that sack, which must be loaded into a seed tank of another row unit or returned to the truck. This exercise can be repeated as many as thirty times to fill a sixteen-row, 30-inch planter with splitter rows.

The example being discussed is not an isolated incident. In fact, farms have become larger with time; and many farmers plant not only the land they own but rented land as well. The same planter often is used to plant a number of separate fields so that the total acres planted per machine has also increased substantially. Yet, the time for planting obviously remains the same. As a result, seed suppliers have begun delivering seed to the farmer in bulk containers typically holding 1500 to 2000 lbs. of seed. Such large containers require handling equipment, such as forklifts. The trend toward shipping in bulk containers, while reducing cost and saving time, has rendered the filling of individual seed tanks impractical due to difficulties in positioning the handling equipment and controlling the starting and stopping of the seed flow out of the bulk containers when desired, and without spillage.

Another disadvantage with individual seed hoppers is that in order to inspect or repair the seed meter, the hopper and meter must be removed together from the row unit to gain access to the mechanism in the meter. The combination can be heavy to lift, particularly if the hopper is full or nearly full, and the operation can result in spillage of seed or require that the hopper first be emptied.

There are some existing planters which do have centralized storage and distribution of seed. Most such systems use a separate trailing vehicle, namely a drawn cart for storing the seed. The seed is then moved forward to the planter from the rear cart by means of forced air. The seed is then distributed to the individual row, or in the case of seed drill, to the openers. Another commercial planter uses a centralized seed storage tank mounted directly on the planter frame, but the planter frame is rigid. This limits the width of the overall planter to approximately twenty feet (eight rows of thirty inch spacing between adjacent rows). A planter with a rigid frame of twenty feet obviously does not adjust to variations in ground contour as does one with a width of ten feet or less.

A row crop planter of twelve or more rows having a capability of planting at a thirty or thirty-six inch spacing will preferably have three planter frame sections, a center section, a left wing section and a right wing section. The wing sections are articulated respectively to the outboard ends of the center frame section—that is, the wing sections are hinged to rotate independently of one another about horizontal axes parallel to the direction of travel, so that the overall planter frame may follow variations in ground contour more closely. There are currently no commercial row crop planters having a multiple section frame and a centralized bulk seed storage carried directly on the planter frame.

Modem grain drills are typically constructed using a continuous seed tank placed above the furrow openers. A seed metering device is usually attached to the bottom of the tank for each opener, and a flexible hose attached to each seed meter directs the seed flow to the furrow. This generally accepted configuration has some drawbacks. 1). The seed tank must be positioned high enough that there is sufficient room below the seed meter to allow the seed flow hose to flex through the range of motion of the openers. This usually means that some sort of operator platform is necessary for filling the tank with seed. 2). The tanks are generally flat bottomed with holes for mounting seed meters spaced to match the spacing of the openers. When planting row widths of 10–15 in., a considerable amount of seed is left in the tanks between the seed meter openings. Also, the tank must be filled evenly across its length so that all the meters are supplied with seed. As the tank becomes empty, the farmer must stop and rake the seed level across the bottom of the tank to use up all the seed. 3). Farmers frequently change seed varieties as they move from field to field. With current grain drill designs, it is necessary to drain the tank at each individual seed meter and then sweep out the remaining seed, if left, when changing seed varieties or types.

SUMMARY OF THE PRESENT INVENTION

The present invention includes a row crop planter having a drawn frame supported by wheels. The main frame includes a double toolbar construction (i.e., fore and aft mounting bars) and includes a center section and left and right wings. The center section is supported by wheels; and the outboard ends of each wing is also supported by one or more wheels which may be adjustable in height. As used herein, the term "toolbar" is broadly construed to mean an elongated frame member, extending transversely of the direction of travel, to which individual row units are mounted. Thus, the present invention includes a frame having a forward toolbar and a rear toolbar. Individual push-type row units are mounted by conventional four bar linkages in front of the forward toolbar, and conventional pull-type row units are mounted by four-bar linkages behind the rear toolbar and located between the forward units. If only the rear row units are used, as is typically the case for planting corn, for example, the row spacing may be thirty inches, by way of example. When the planter is set up to plant beans, both the front row units (sometimes referred to as "splitter" units) and the rear units are used at the same time and the inter-row spacing is fifteen inches.

In the illustrated embodiment, the double-toolbar planter frame has a center frame section, a right wing frame section hingedly mounted to the center frame section for movement about a horizontal axis parallel to the direction of travel, and a left frame section similarly mounted to the left side of the center frame section for vertical movement (i.e. articulated) which permits the overall three-section planter to follow ground contour more accurately. Since the individual row units are independently amounted by four-bar linkages, the planting depth for each individual row unit is accurately maintained.

The individual frame sections (that is, left section, center section and right section) are strengthened by means of lattice frameworks extending directly upwardly from each of the forward and rear toolbars for each planter frame section. The toolbars for each planter frame section are further strengthened and formed into an integral frame by means of spaced frame members extending between and welded to the front and rear toolbars.

Thus, each of the center section, right wing section and left wing section includes a frame in the general form of a "U" when viewed from the side, the forward portion of the "U" being formed by the forward upright lattice framework, the rear portion being formed by the rear upright lattice framework, and the bottom being formed by the toolbars and fore-to-aft connecting members.

A storage tank or very large hopper having an open top covered with a removable lid is mounted above each wing frame section, and each seed storage tank is received between and supported by the upright lattice frameworks, fore-and-aft, of each wing frame section. Moreover, the seed storage tanks are elongated in the direction of extension of the wings and they extend inboard of the associated wing pivot joint. That is, the inboard end of each of the seed storage tanks extends into the U-shaped frame of the center frame section, and is supported by the forward and rear upright lattice frames of the center frame section as well as by its associated wing frame section. Each seed storage stores seed for as many as ten or more row units. Each row unit may have a small hopper, called a buffer hopper.

Each seed storage tank is mounted at its outboard end to its associated wing lattice framework, in both the front and rear, by means of a generally upright support link, pivotally mounted at its upper end to the seed tank and pivotally mounted at its lower end to the adjacent upright lattice framework of a wing frame. The inboard end of each seed storage tank is connected, both front and rear, by a generally horizontal link having its outboard end pivotally connected to the adjacent lattice framework of the center section, and its inboard end pivotally connected adjacent the inboard end of the horizontally elongated seed storage tank. The inboard end of each storage tank is provided, both in front and rear, with an inboard pivot support member and an intermediate support pivot member. Thus, each seed storage tank extends along its associated wing section over a major portion of the lateral dimension thereof, and for a substantial portion of the adjacent central frame section.

As a wing section rotates downwardly in adjusting to a downwardly-sloping ground contour, the associated seed storage tank is supported by the intermediate pivot members; and the inboard end of the storage tank is raised slightly above the center section by the intermediate pivot members mounted to the seed storage tank, both front and rear. The intermediate pivot members are arranged to engage, and pivot about the lattice framework of the center frame section, slightly inboard of the hinge location between the wing frame section and the center frame section. The horizontal link connecting the inboard and the tank of the seed storage tank to the framework of the center frame section is in compression, resisting lateral, downward movement of the entire seed storage tank.

When a wing section moves upwardly to adjust to ground contour, the inboard end of the tank is supported by the inboard pivot members located at the inboard end of the seed tank, and the horizontal link is in tension, resisting inward movement of the seed storage tank toward the center of the planter. This support structure and linkages for the seed storage tanks not only permits the tanks to move relative to the row units and the frame sections in order to accommodate variations in ground contour, but it reduces the amount of such motion and makes it possible to mount the seed tanks in low profile above the planter frame which is believed to be of considerable importance and value to the farmer, and it limits the number of seed storage tanks in a multi-section planter to two while increasing their storage capacity by permitting them to extend over, and be supported by, adjacent articulated frame sections.

In this manner, the seed storage tank is permitted limited vertical movement relative to the articulated frame sections, and limited lateral movement, while adjusting to the hinging motions of the adjacent articulated frame sections during use. Moreover, each seed storage tank, one on the right side and one on the left side, is mounted for independent movement relative to the other seed storage tank so that they may independently accommodate the articulating motions of the left and right planter wing sections. Further, the total storage capacity of seed is greatly increased over individual hoppers on row units, and the number of storage tanks is limited to two. Because of the is large size of the storage tanks and the large top opening in each seed storage tank, they are easily loaded by machine to reduce the loading time and effort.

The seed storage tanks are received in, and mounted to, the U-shaped channels formed by the upright lattice frameworks and dual toolbar construction of the planter frame sections. This enables the seed tanks to have a low, attractive profile, yet provide a substantial volume for seed storage. A low tank profile has a number of advantages. First, a low tank profile provides safety features in that it does not interfere with overhanging gates or other structures when passing. Secondly, the farmer operator has an unobstructed view of the region behind the planter insofar as the height of the tanks is lower than the normal vision line of a farmer operator seated or standing on the tractor. Further, a substantial operational advantage is provided in that the center of gravity for the seed tanks is lower than if the tanks were located further above the planter frame. In addition, the seed storage tanks extend laterally and occupy substantially the entire width of the planter in the field use position. This distributes the weight of the seed tanks (which is substantial when they are full), laterally over the width of the planter while increasing total seed storage capacity.

A seed handling mechanism inside the tanks also provides substantial advantages in operation. The seed handling mechanism within each tank includes an auger conveyor located near the bottom of the tank and extending substantially the entire length of the tank. The length of the floor auger conveyor extends transverse to the direction of travel of the planter. The tank, at its bottom, is narrowed to form a trough to enhance the effectiveness of the floor auger in clearing the tank of substantially all remaining seed. The seed is delivered from the bottom of the tank, by means of an elevator, to an elongated distribution manifold located at the top of each tank and extending longitudinally of the tank. The distribution manifold also contains an auger which conveys the seed longitudinally of the tank. A discharge manifold and flexible connection hose are coupled to the distribution manifold for delivering seed under gravity from the distribution manifold to individual small, closed tanks, sometimes referred to as "buffer hoppers" which supply the seed metering devices associated with each row unit.

Some discharge manifolds extend forwardly and others rearwardly; and they may thus be positioned nearly directly above their associated row units. The discharge manifolds are positioned near the bottom of the elongated distribution manifold so that the flexible delivery hose may remain generally vertical but be routed either slightly forwardly (to supply push-type planter row units) or slightly rearwardly (to supply pull-type planter row units). Thus, locating the seed storage tank at a position above and between the front and rear toolbars of the planter frame not only achieves a more uniform weight distribution for the seed tanks along the planter frame, but it also reduces the lateral distance over which seed is delivered from the distribution manifold to the individual buffer tanks. The upper location of the distribution manifold in the seed tank permits the seed to be delivered from the storage tank to the planting units under gravity, while maintaining the advantages described above of a low profile seed tank structure.

Using the present invention, a grain drill could be constructed with the seed meters located at a high point in the tank, above the bottom. The lift augers would bring the seed up to the meters and evenly distribute the seed to all openers. The delivery hoses would extend to the openers form a position along the bottom of the seed tank, and have enough length to flex with the movement of the opener device. Draining the system to change seed varieties or type could be done with the floor auger. The over-all machine height could be lowered and the function of the machine improved.

Other features and advantages of the present invention will be apparent to persons skilled in the art of the following detailed description of one embodiment accompanied by the attached drawing wherein identical reference numerals refer to like parts in the various views.

DETAILED DESCRIPTION OF THE ILLUSTRATED EMBODIMENT

Figure 1:
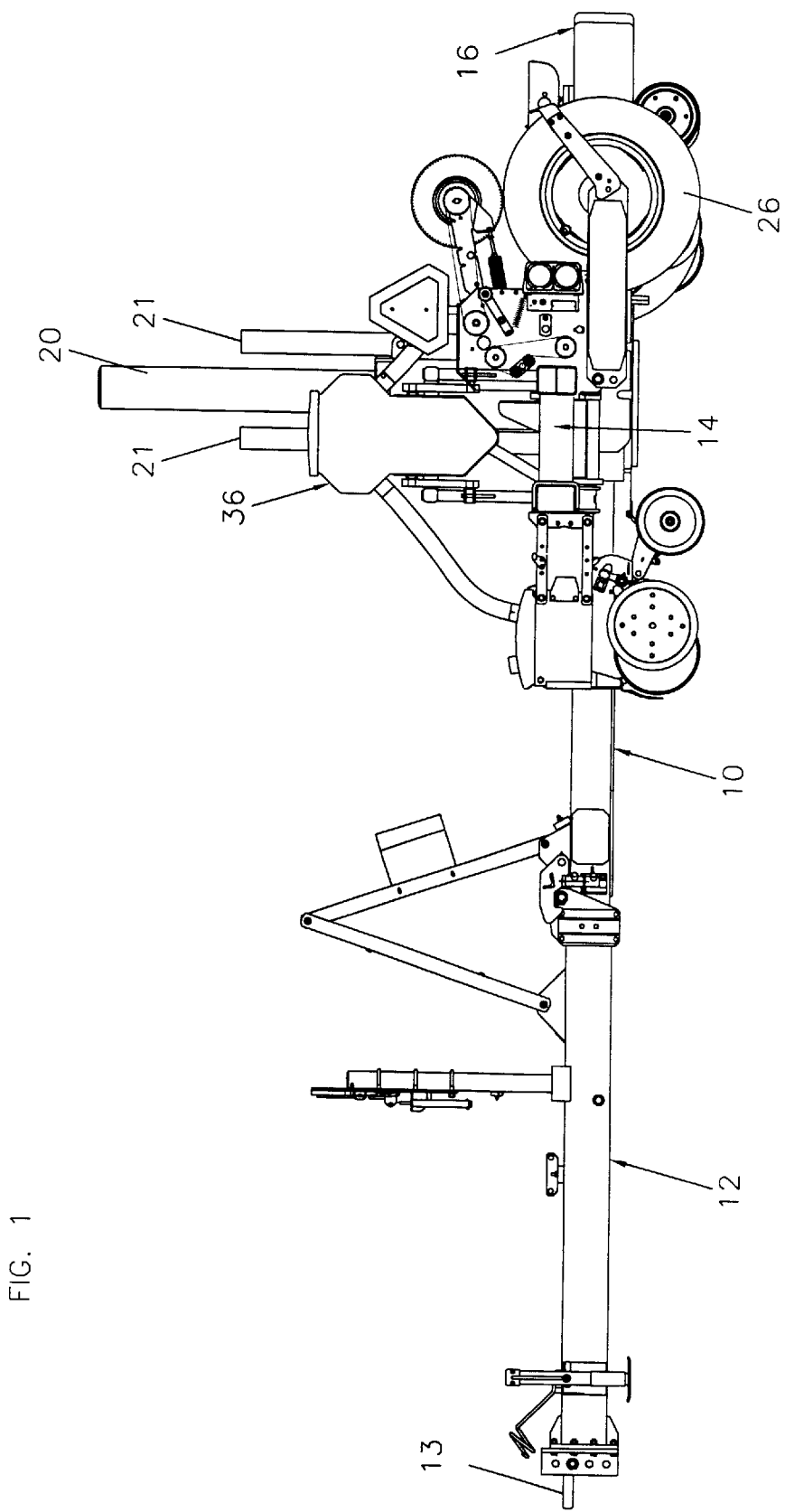
FIG. 1 is a left side elevational view of a row crop planter incorporating the present invention.

Referring first to FIG. 1, there is shown an agricultural row crop planter generally designated 10. The planter 10 includes an extendable hitch tongue generally designated 12 which is adapted to be connected to a tractor by means of a hitch 13. The tongue 12 is shown in FIG. 1 in the retracted position, but as known in the art, it may be extended or elongated so that a lift frame carrying the planter row units, to be described, and generally designated 14 may be raised from the field use position shown in FIG. 1 and turned ninety degrees (i.e., parallel to the plane of the page of FIG. 1) so that the planter lift frame extends longitudinally in the direction of travel of the tractor. This narrows the configuration for road transport.

The rear end of the tongue 12 is rigidly affixed to an axle assembly generally designated 16. The axle assembly 16 carries the main axle on which the ground support wheels 17 for the axle assembly and center frame section are mounted.

Also mounted on the axle assembly is an upright post 20 having a generally rectangular cross-section. The lift frame 14 (see FIG. 7) is comprised of toolbar frames for the center section and both wing sections, as will be further described. The lift frame 14 is slidingly received on the upright post 20 and it may be raised vertically, guided by the post 20 and lifted by hydraulic cylinder 21 to the raised position. When it is desired to arrange the planter for transport, the lift frame is turned by an hydraulic cylinder a quarter turn from the field use or planting position (seen in FIG. 3) by rotating the post 20 so that the lift frame extends longitudinally in the direction of travel for road transport. The tongue 12, of course, is in the extended position for road travel; and it is seen in FIG. 1 in the retracted position, tropically used for planting.

What has been described thus far in connection with the drawing is known and corresponds substantially to the implement covered by U.S. Pat. No. 5,346,019 entitled "Agricultural Implement with Common Mechanism for Raising/Lowering and Rotating a Lift Frame about a Vertical Axis."

Figure 4:
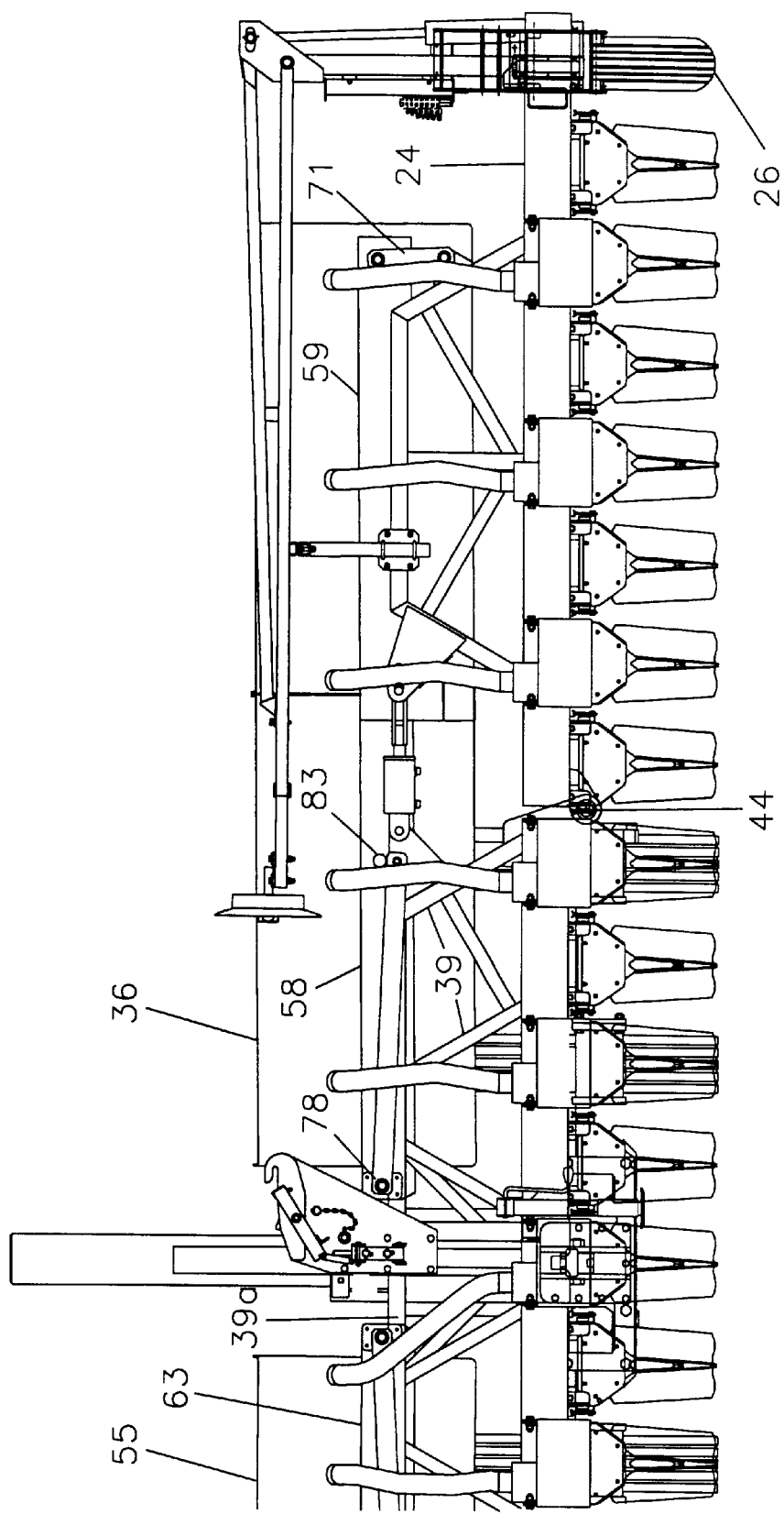
FIG. 4 is a front view of the left wing section and a portion of the center frame section of the planter of FIG. 1 with the planter on horizontal level ground.
Figure 7:
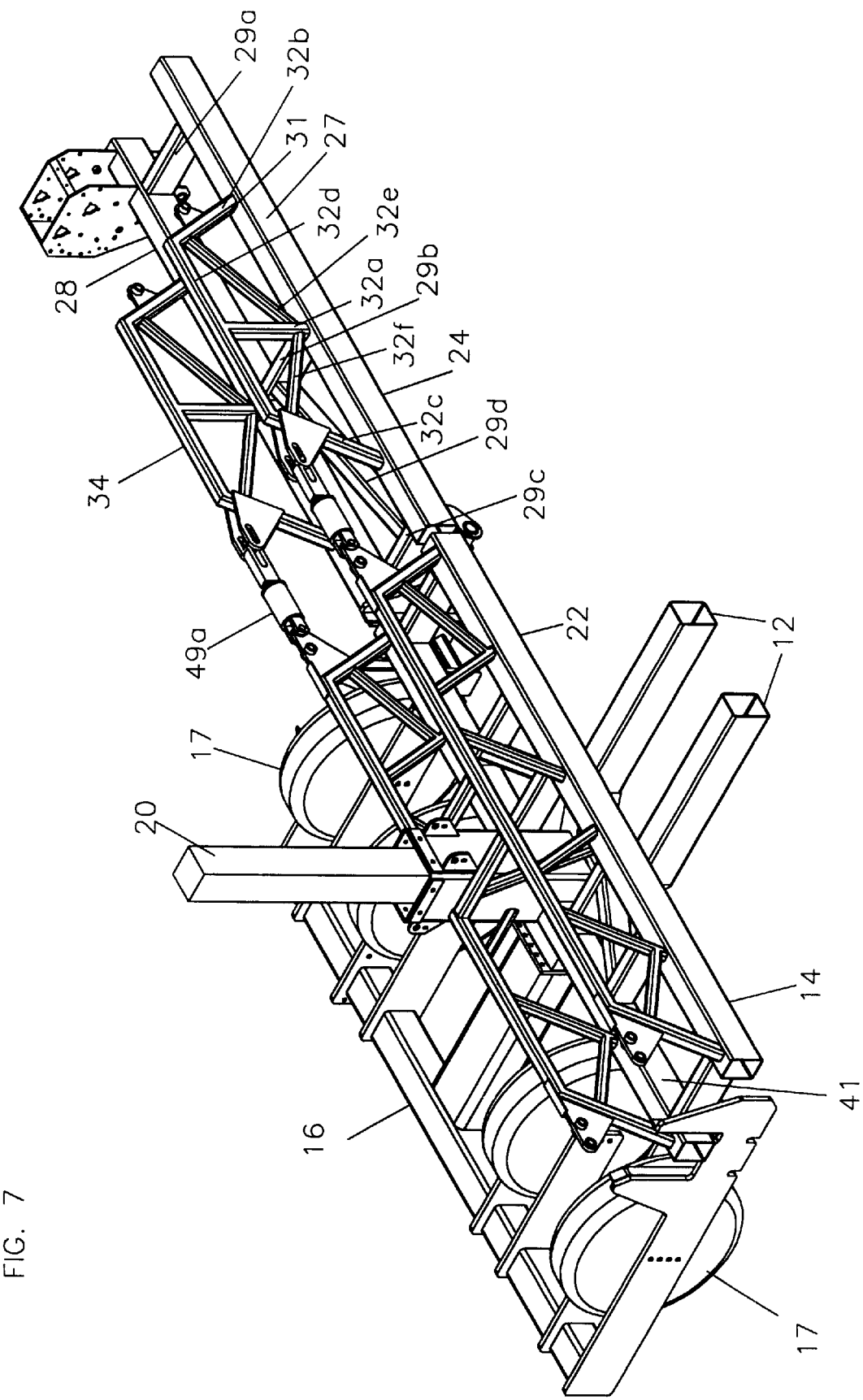
FIG. 7 is an upper, left frontal perspective view of the planter toolbar frame with the seed tanks removed.

The lift frame 14 has three sections, a center section designated 22 in FIG. 7, a left wing section 24 (FIG. 7), and a right wing section generally designated 25 in FIG. 4. Each of the wing sections 24, 25 are similar, in mirror image, so that only one need be described in detail for a complete understanding of the invention. What is present in one wing section is also present in the other, unless noted otherwise.

Referring to FIG. 7, the left wing section 24 includes a forward mounting bar 27, also referred to as a "toolbar," and a rear toolbar 28. As will be described, forward or "push-type" planter row units (92 in FIG. 2) are mounted on the forward toolbar 27 and "pull" planter row units (94 in FIG. 2) are mounted on the rear toolbar 28 in a conventional manner. The outboard end of each wing section is supported by a conventional gauge wheel assembly (see the left gauge wheel 26 in FIGS. 1 and 3, but which is removed from FIG. 2 for viewing the frame and row units).

The toolbars 27, 28 are parallel and extend transverse of the direction of travel in the field use position, and they are formed into a rigid frame by means of intermediate frame connecting members, 29a, 29b and 29c in FIG. 7. Additional structural integrity may be provided by a diagonal frame member 29d.

Mounted to the top of the forward toolbar 28 is a forward, upright lattice framework generally designated 31. The lattice framework 31 includes an upright center member 32a, an outboard member 32b which is generally upright and slightly inwardly inclined, an inboard member 32c which extends upright and slightly outwardly, a horizontal top member 32d which is welded to the tops of the members 32a, 32b, 32c; and diagonal brace members 32e, 32f, which are affixed respectively between the upright center frame member 32e and the inclined outer member 32b and inclined inner member 32c forming the upright lattice for framework 31. The configuration of the constituent members of the various frames disclosed herein are not critical as persons skilled in the art will appreciate; and alternate configurations will be useful to perform the purposes of those disclosed.

A similar upright lattice framework generally designated 34 is mounted to the top of the rear toolbar 28 of the left wing section frame 24.

Figure 8:
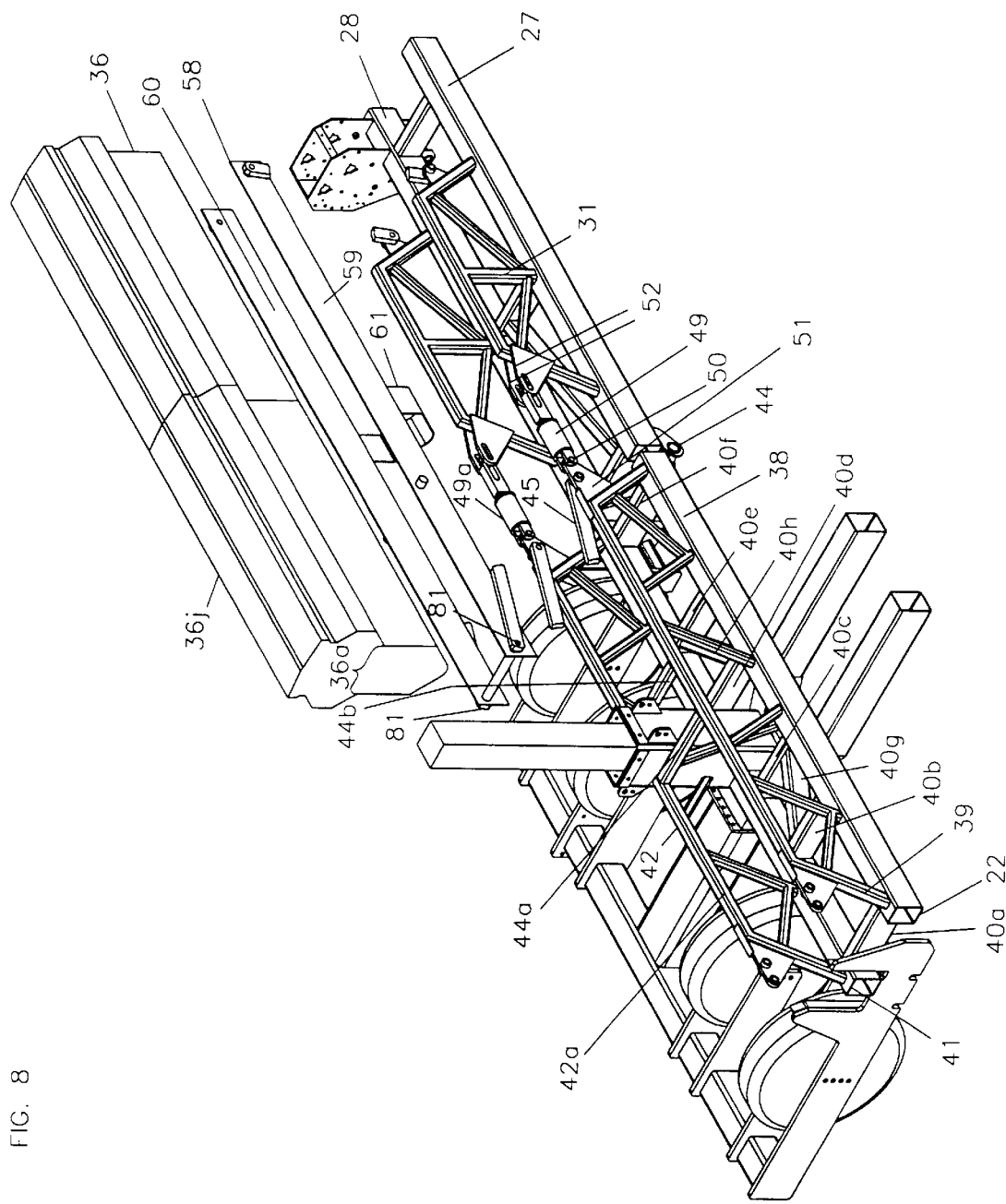
FIG. 8 is a view similar to FIG. 7 with the left seed tank and its metal support in exploded relation relative to the dual toolbars of the center frame section and left wing section.
Figure 9:
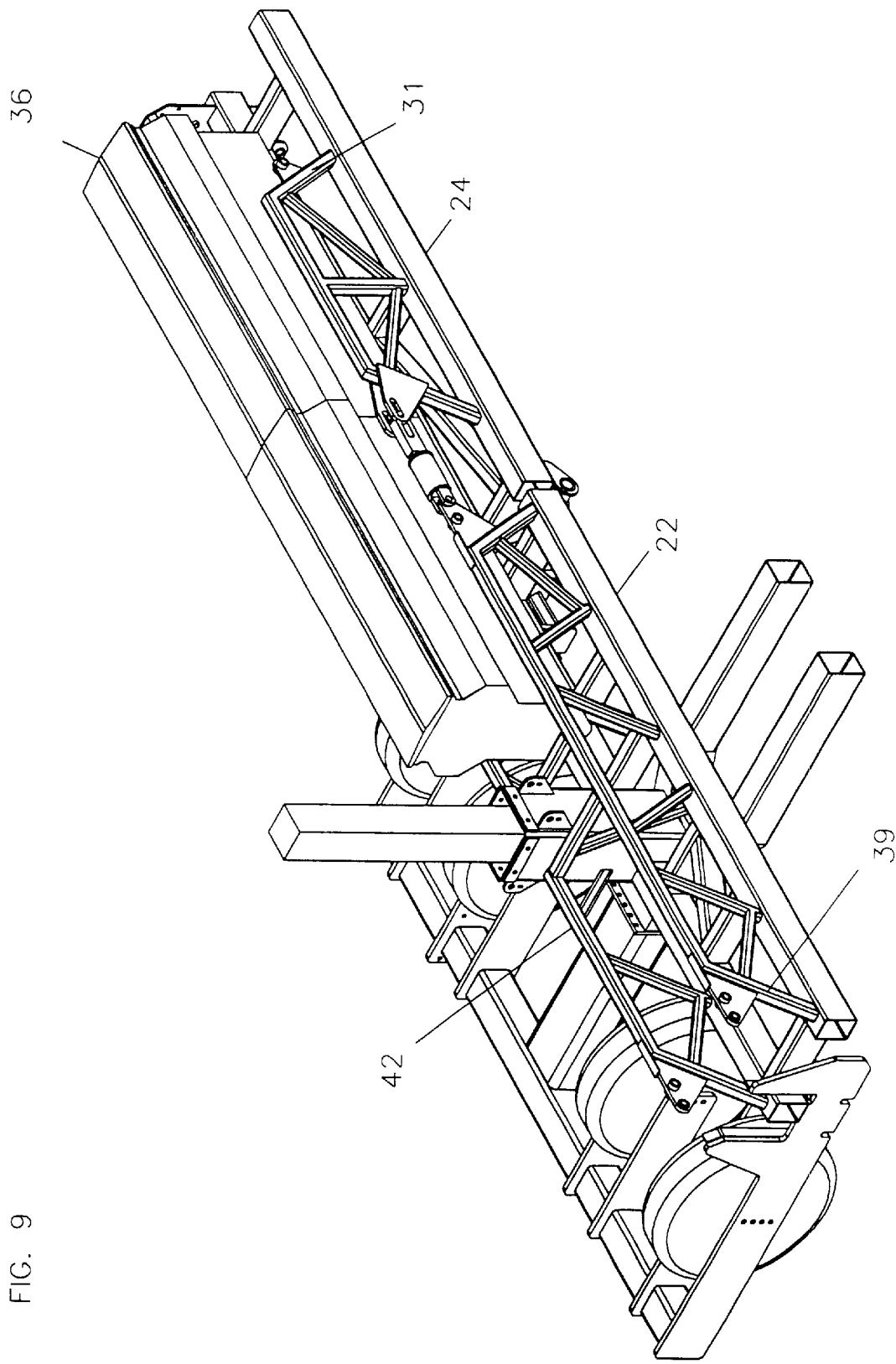
FIG. 9 is a view similar to FIG. 7 with the left seed tank in assembled relation with the left wing and center section frames.

It will be appreciated that the forward and rear toolbars 27, 28 together with the intermediate frame members 29a–29c and diagonal frame member 29d, and the forward upright lattice frame 31, and rear upright lattice framework 34 form a bridge or U-shaped channel (when viewed from the side) which permits a seed storage tank, such as the one generally designated 36 in FIG. 8, to be mounted to the upper portions of the lattice frameworks and be carried by this bridge structure, as will be further discussed below.

Turning now to the center frame section 22 as seen in FIG. 8, it includes a forward toolbar 38, to the top of which is mounted an upright lattice framework generally designated 39, and a rear toolbar 41 to the top of which is affixed a rear upright lattice framework generally designated 42. The forward and rear toolbars of the center section are formed into a rigid frame by means of longitudinal connecting members 40a–40f, as well as diagonal frame members 40g, 40h. The seed tanks each overlap the hinged juncture between the center section and the associated wing section, and extend substantially all the way to the center of the machine. The forward upright lattice framework 39 and the rear upright lattice framework 42 of the center section are also braced by inboard upper longitudinal frame members 44a, 44b, which are fixed respectively between the upper horizontal frame member of the lattice framework 39 and 42a of the rear upright lattice framework 42 of the center section adjacent to the lift post 20.

Each of the wing section frames is hinged to the adjacent end of the center section frame so that the wings may rotate or articulate in a vertical direction independently of one another. The pivot connection between the forward toolbar 27 of the left wing section 24 and the forward toolbar 38 of the center frame section is shown at 44 in FIGS. 4 and 8. A corresponding pivot (rotatable on a common axis) is located between the rear toolbar 28 of the left frame section and the rear toolbar 41 of the center frame section. Corresponding fore-and-aft pivots with their rotational axes aligned to form a hinge and extending in the direction of travel of the planter, are provided between the right side of the associated forward and rear toolbars of the center frame section and the right wing section.

Still referring to FIG. 8, the adjacent portions of the forward upright lattice framework 31 of the left wing section and the forward upright lattice framework 39 of the center frame section are joined by an hydraulic cylinder unit 49. The case or cylinder end of the hydraulic cylinder unit 49 is pivotally connected at 50 to a mounting bracket 51 fixed to the adjacent side of the forward lattice framework 39 of the center section. The rod end of the cylinder carries a pin received in slots in a pair of brackets 52 mounted on the forward lattice framework 31 of the left wing section 24. As is known in the art, when the cylinder 49 is retracted, the left wing section 24 is prevented from flexing downwardly, and when the cylinder 49 is extended, the left wing section may pivot both upwardly and downwardly relative to the horizontal, but within limits defined by the slots in the mounting brackets 52. A similar hydraulic cylinder unit 49a is connected between the rear upright lattice frameworks of the center frame section and left wing section, respectively. Corresponding hydraulic cylinders (not seen in the drawing) are provided to connect the upper portions of the lattice frameworks for the forward and rear toolbars of the right frame section to the forward and rear lattice frameworks of the center frame section and they operate in the same manner as described in connection with the left side cylinders 49, 49a.

As seen in FIG. 8, the left seed tank 36 is of a shape which permits it to be received between the forward and rear upright lattice frameworks of the forward and rear toolbars for the center frame section and the left wing frame section. Specifically, the seed tanks extend across the hinges connecting the wing sections to the center frame section (see FIG. 5). The inboard ends of the two seed tanks 36, 55 (for the right side of the planter) extend well into the center section and their inboard ends are spaced adjacent the center lift post 20 (see FIG. 4).

Figure 10:
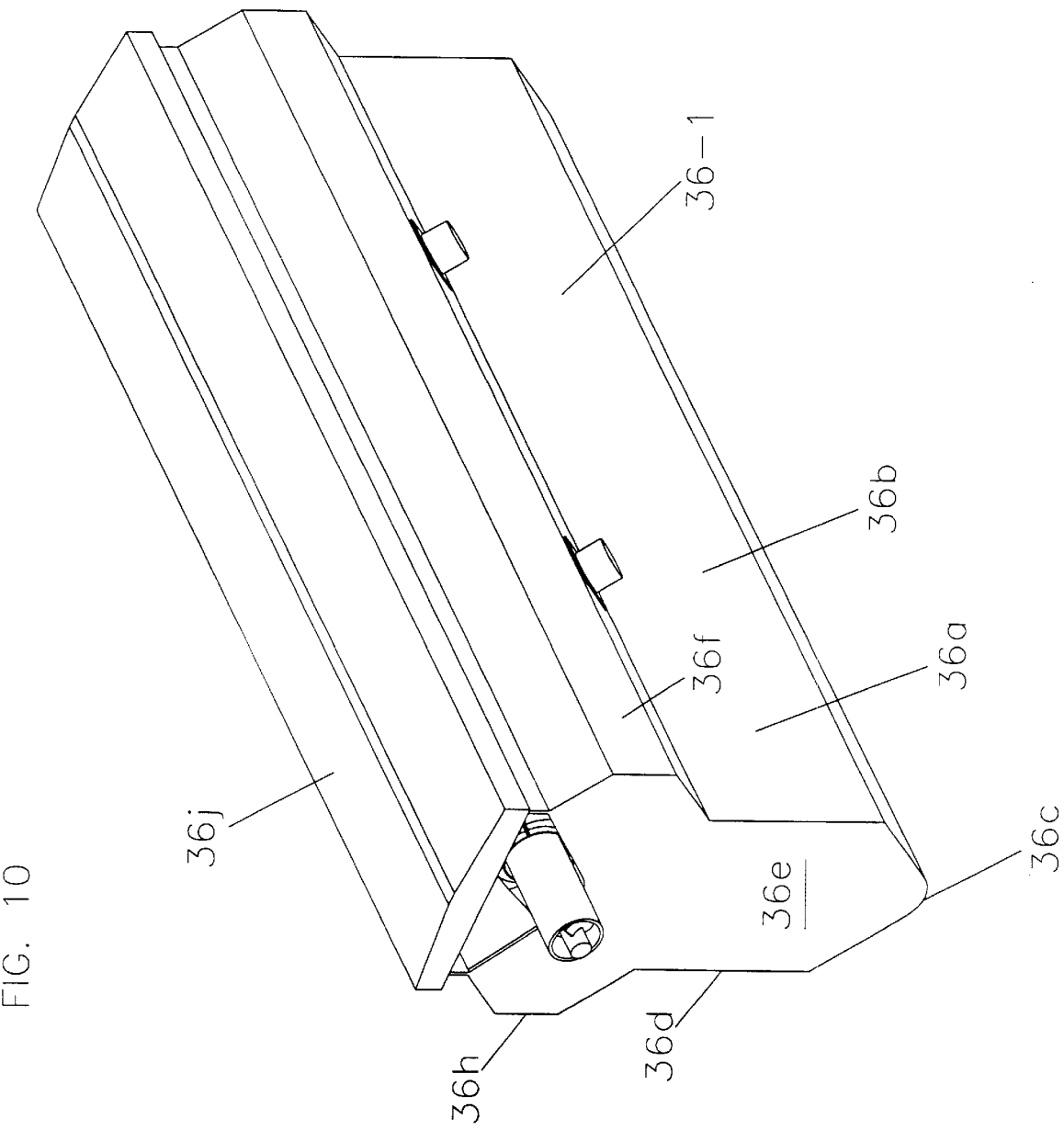
FIG. 10 is an upper, frontal right side perspective view of a segment of the seed storage tank.
Figure 11:
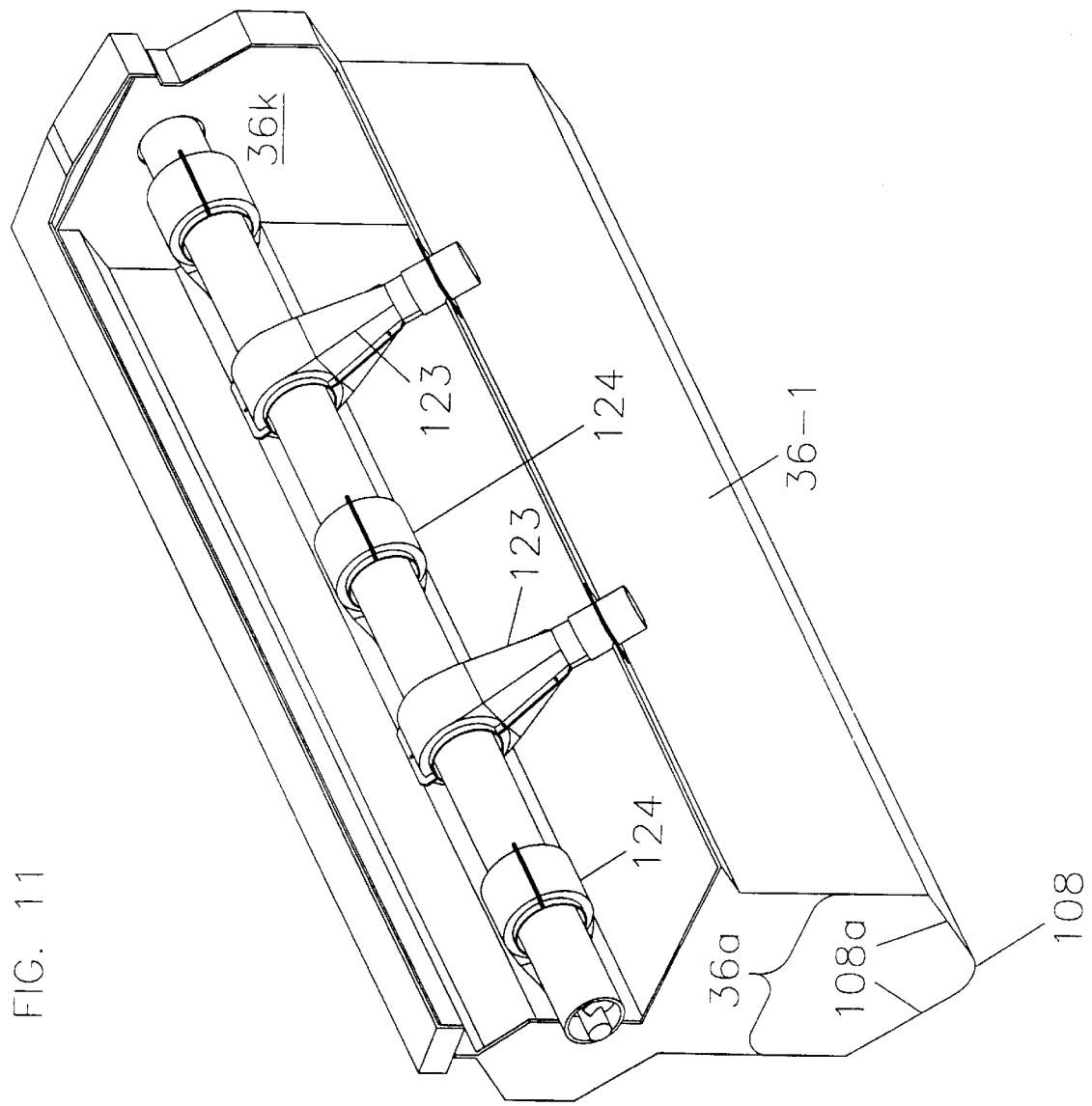
FIG. 11 is a view similar to FIG. 10 with a portion of the seed storage tank cut away to show the distribution manifold and the front and rear discharge manifolds.
Figure 12:
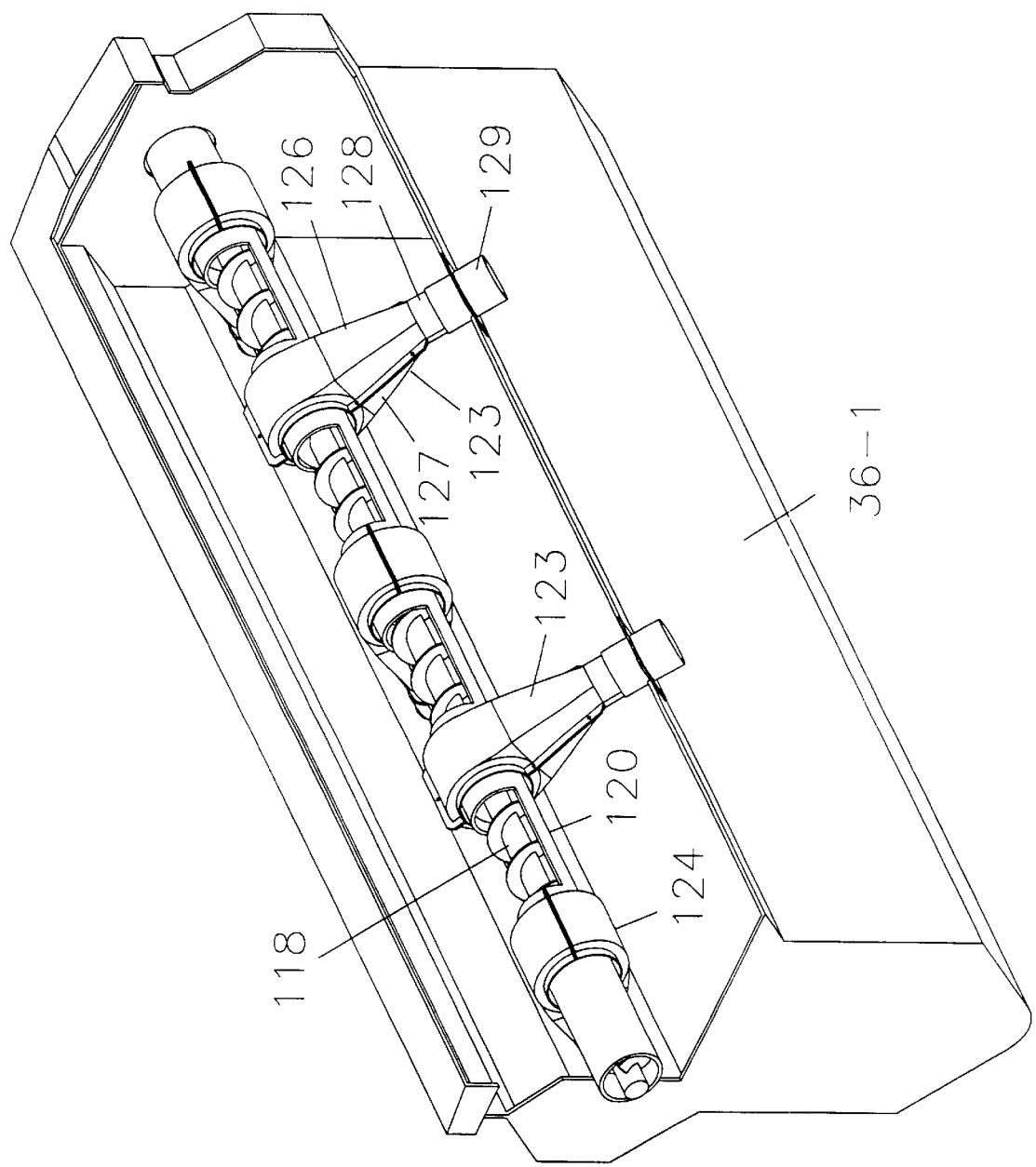
FIG. 12 is a view similar to FIG. 11 with upper sections of the distribution manifold removed to show the distribution auger.
Figure 13:
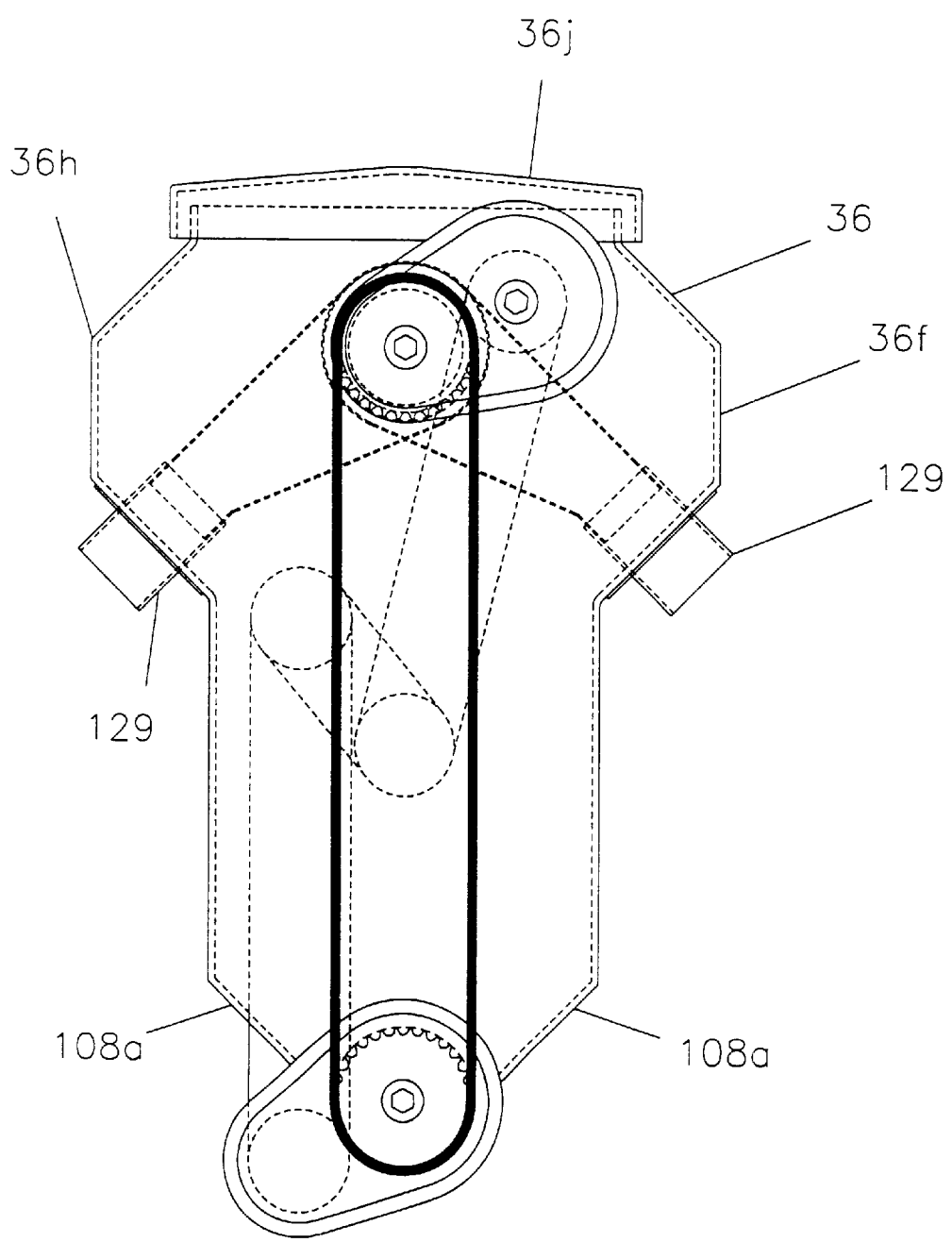
FIG. 13 is an end view, partly in diagrammatic form, of a seed storage tank.

To reduce cost, the seed storage tank 36 may be fabricated from two individual and identical boxes such as the one designated 36-1 in FIGS. 10–12, with adjacent end walls removed to make one continuous storage tank 36 having a continuous, completely open top covered by a cover 36j. Making smaller boxes (e.g., having a length of six feet) reduces manufacturing and tooling costs and permits the same smaller boxes to be joined to form tanks even larger than the two-unit tank 36, such as twelve or eighteen feet by joining them together and removing internal walls. The structure of the tanks is shown in diagrammatic form in FIGS. 4 and 5, and will be understood by those skilled in the art, however, from a subsequent description of FIGS. 10–12.

Turning now to the seed storage box 36-1 as seen in FIG. 10 (see also FIG. 2), it includes a lower central portion 36a formed by a front wall 36b, a trough-shaped bottom wall 36c, a rear wall 36d and left and right end walls, the right or inner end wall being shown in FIG. 10 and designated 36e. The other end wall, designated 36k in FIG. 11 is removed when joined to another tank section to form the complete tank.

Above the upright front and rear walls 36b, 36d, the seed storage tank 36 flares upwardly and outwardly, forming a forward extension (or overhang) generally designated 36f and a rearward extension (or overhang) 36h, each of which extend the full length of the tank and overhang the lattice frames. The top of the tank 36 is formed into an inlet opening, covered by the cover 36j.

Figure 2:
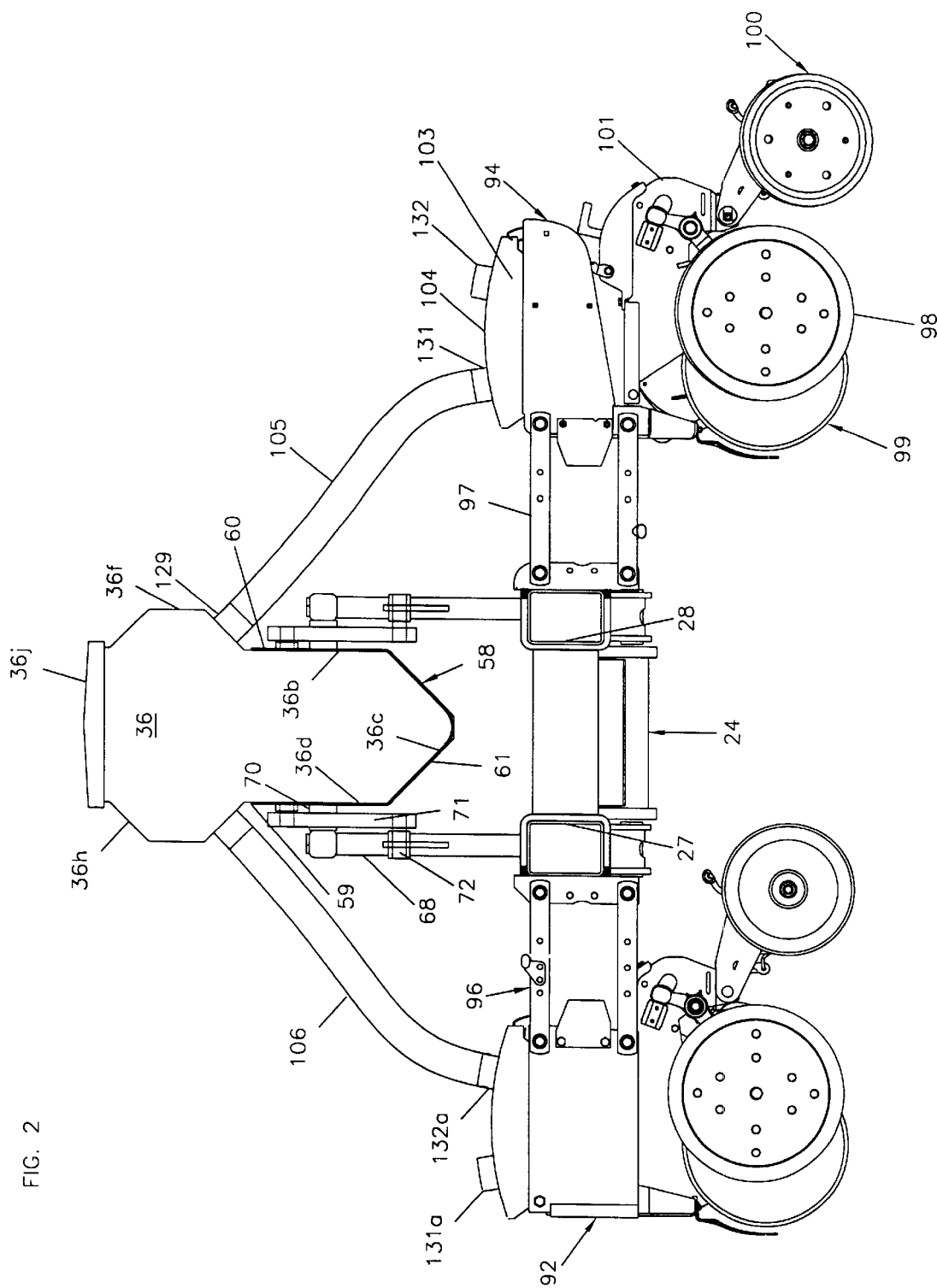
FIG. 2 is a close up left side view of the planter of FIG. 1 with the wing gauge wheel and row marker removed for viewing the row units and wing frame.

Referring now to FIGS. 2 and 8, the lower, reduced central portion 36a of the tank 36 is received in and supported by a metal support generally designated 58. The metal support 58 includes front and rear laterally elongated bands 59, 60, joined at their center by a strap 61 which extends beneath the center portion of the tank and conforms to the trough shape of the narrowed lower portion 36a of the seed storage tank. The right seed storage tank 55 is similarly constructed, supported and mounted, but in mirror image. The metal support 58 is part of the tank and could be eliminated if the storage tanks were made of metal but that may be too expensive. Further, the metal support could be inside the tank and fastened to the tank from within.

Figure 5:
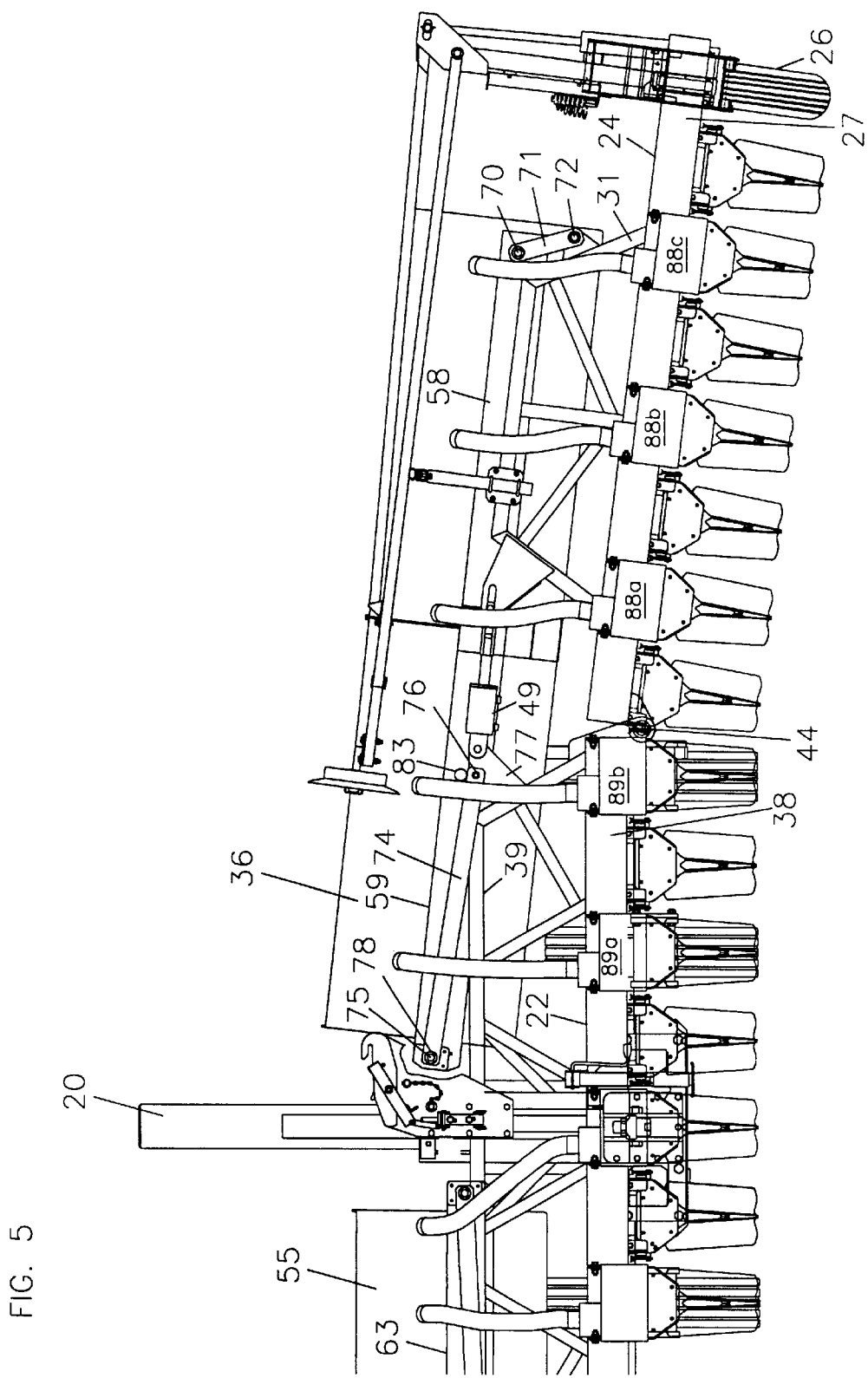
FIG. 5 is a view of the planter similar to FIG. 4 and with the left wing section located on a downward slope.

Each of the seed tanks is similarly mounted, front and rear. Reference is made to FIGS. 5–8 which show the front mounting for the left storage tank 36. For the right side seed tank 55, the associated metal support is designated 63 in FIG. 4. The left side wing section 24 is seen in FIG. 5.

The left side or outboard end of the horizontal elongated band 59 of the metal support frame 58 for the left side seed tank 36 is pivotally connected at 70 to a link 71 (sometimes called the vertical or upright link), the other end of which is pivotally connected at 72 to the left side of the front upright lattice framework 31 of the front toolbar 27 of the frame for the left wing section. Adjacent the inboard end of the band 59 of the metal support 58, a generally horizontal link 74 is pivotally connected at 75. The left side of the link 74 is pivotally connected at 76 to a bracket 77 mounted to the left side of the upright lattice framework 39 of the front toolbar 38 of the center section.

The rear of the seed tank 36 is similarly mounted by an upright link similar to link 71 to the rear upright lattice framework of the left wing section and, at the inboard end of the seed tank, the rear of the seed tank is connected to the rear upright lattice framework 39 of the center section frame by means of a generally horizontal link similar to link 74.

As will be described further below, the function of the upright links (e.g. 71) is primarily to support the outboard end of the seed tank and its contents and to transfer weight to the wing frame, and thence to the wing gauge wheel, while permitting the outboard end of the seed tank to move slightly laterally. The horizontal fixing link 74, however, does not operate in the same manner as the upright support link.

Figure 6:
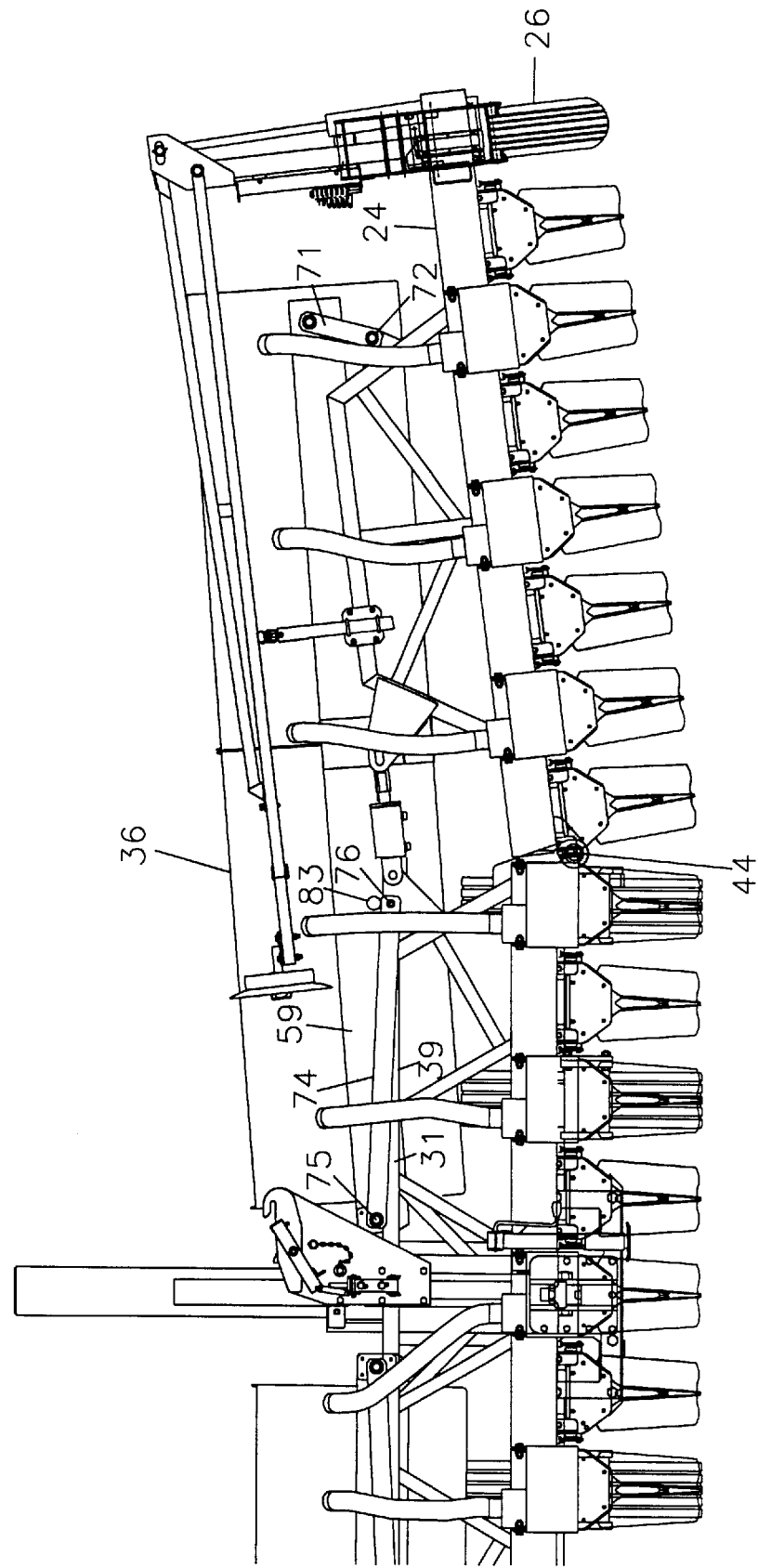
FIG. 6 is a view similar to FIG. 4 with the left wing section on a lateral upslope.

Still referring to FIGS. 4–6, the right or inboard pivot 75 of the horizontal link 74 includes a sleeve or tube 78 (FIG. 4) which is welded to the link 74 and extends rearwardly above the upright rear lattice framework 42 of the center frame section and rests on a top horizontal member 42a. The sleeve 78 extends above the top member 42a and rests on it for certain positions of the left side wing seen in FIGS. 4 and 6. The sleeve 78 acts as a rolling pivot or fulcrum when the wing is raised, as in FIG. 6.

A second stop or pivot 83 is fixed to the horizontal rear band 58 of the metal support 59 and extends forwardly above the horizontal top member 39 of the rear upright lattice framework, just described, and rests on the top of the bracket 77 to form a pivot support for the positions of the right wing shown in FIGS. 4 and 5 (i.e., wing horizontal or lowered). Corresponding support members (i.e., sleeves or rods) for the inboard pivot support members 78, 83 are provided for the rear of the left seed tank 36 as well as for the front and rear metal bands of the support for the right seed storage tank 55. Moreover, a corresponding intermediate pivot support is provided for the right seed tank 55 similar to those which have been described, but in mirror image, and they function as will presently be described in connection with the left side wing structure.

The outboard end of the left wing section 24 is supported by a conventional gauge wheel generally designated 26 in FIGS. 5 and 6. The inboard end of the wing section is supported by the hinge connection 44 to the center frame section which, in turn, is supported by the previously described wheels 17 mounted on the main axle assembly 16.

As the planter traverses the ground, the left wing section 24 is free, within the limits described above, to remain horizontal, as shown in FIG. 4, or to flex upwardly as shown in FIG. 6, or to flex downwardly as shown in FIG. 5. The flexure depends upon the elevation of the ground being traversed by the wing gauge wheel 26 relative to the ground level being traversed by the support wheels of the center section, as persons skilled in the art will appreciate.

Referring particularly to FIG. 4, when the outboard left side gauge wheel 26 is traveling on ground at the same elevation as the ground on which the main support wheels 17 are located, the left side seed tank 36 remains at the same elevation as the left wing section frame, and the bottom surface of the seed storage tank remains horizontal at a substantially constant distance above the ground. The outboard end of the seed storage tank 36 is supported by the link 71 which is in a substantially vertical position when the wing is on level ground, as seen in FIG. 4. The inboard end of the seed tank 36 is supported by the pivot support 78 resting on the horizontal top member 40g of the front upright lattice framework 35 of the center section frame and a corresponding, aligned pivot support member on the rear of the seed tank. The front side of the tank is similarly supported by a sleeve or rod pivot member 83 resting on the front lattice framework 35 of the center section frame in the horizontal position, and a corresponding rear pivot member resting on the rear upright lattice structure.

By comparing FIG. 5 with FIG. 4, the operation of the seed tank support mechanism can be understood. When the left wing gauge wheel 26 encounters a depression or lower contour, the wing section rotates clockwise relative to the hinge 44 between the left wing frame section and the center frame section, as seen in FIG. 5. The intermediate pivot support member 83 remains in contact with and rests upon the bracket 77 mounted to the forward upright lattice framework 39 of the center section frame. This causes the seed tank to rotate about the pivot or fulcrum member 83 which is permitted to roll slightly to accommodate the motion of the seed tank seen in FIG. 5. The inboard pivot member 78 raises slightly off the upright lattice framework of the center section; and the seed tank 36 rotates clockwise slightly about the pivot member 83, acting as a rolling fulcrum.

It will be observed that the distance between the bottom of the seed tank 36 and the horizontal plane of the forward and rear toolbars of the left frame section 24 remains substantially constant in FIG. 5, and that there is comparatively little lifting even of the inboard end of the seed tank relative to the frame of the center section. It will also be observed, as will be further described below, that in this position, the seed tank continues to feed seed to the three front row units mounted to the front toolbar of the left wing section, these row units are designated 88a, 88b and 88c in FIG. 5, as well as to the front row units mounted to the front toolbar of the center frame section, the two row units on the left side being designated respectively 89a and 89b in FIG. 5.

Persons skilled in the art will readily be able to substitute other structures for these pivot members which permit the inboard end of the seed storage tanks to rotate and more laterally simultaneously while supporting the seed tanks in order to accommodate the motion described under various use conditions encountered.

During the upward motion of the outboard end of the wing section illustrated in FIG. 6, the upright link 71 connecting the metal support of the seed tank 36 with the outboard side of the upright forward lattice framework 31 of the left wing section remains generally upright and continues to support the weight of the seed tank, together with the corresponding upright link on the rear of the seed tank, and the two aligned pivot support members or stops, such as the one designated 83 on the metal support 59.

Turning now to a comparison of FIG. 6 with FIG. 4, the operation of the seed tank support structure will be described with reference to the wing gauge wheel 26 riding over an elevated section of land, as represented in FIG. 6. In this case, the wing section rotates counterclockwise about the pivot 44, the upright link 71 rotates slightly clockwise about the lower pivot 72, elevating the outboard end of the seed tank 36 slightly, and employing the inboard pivot member 75 as a support bearing or rolling fulcrum to support the inboard end of the seed tank and permit the tank to rotate counterclockwise slightly. The intermediate pivot member 83 and its corresponding rear pivot member are raised above the upright lattice framework of the center section. It will be observed that the variations in height between the bottom of the seed tank and the toolbars of the wing section and center frame section are increased slightly in the region above the hinge pivot 44, but this distance is otherwise substantially the same, and even that height variation does not unduly stress the flexible hoses feeding seed from the upper portion of the seed tank to the row units, as will be better understood from subsequent description.

Returning now to FIG. 2, individual planter row units such as the one designated generally by reference numeral 92 are mounted in laterally spaced relation, as is known in the art, to the front toolbar 27 of the left wing section 24, and similar row units such as the one generally designated 94 in FIG. 2 are mounted to the rear toolbar 28. Row units are similarly mounted along the front and rear toolbars of the center section and the right wing section. The row units 92 mounted in front of toolbar 27 are referred to as "push" units and the row units 94 are pulled by the rear toolbar 28. Each of the row units 92, 94 is otherwise similar in its overall structure and function. A four-bar linkage generally designated 96 is mounted to the rear of the frame of push-type row unit 92 and to the front toolbar, and a similar four bar linkage 97 is mounted to the rear toolbar 28 and to the front of the frame of the pull-type row unit 94.

Turning then to the row unit 94, it includes a twin-disc furrow opener 99, a pair of depth gauge wheels, one of which is shown at 98, and a rear furrow-closing device generally designated 100, all of which are conventionally mounted to a row unit frame 101 to which the four-bar linkage 97 is mounted. Above the frame 101 there is mounted a tank 103 which is covered by a lid 104. The tank 103 is sometimes referred to as a "mini" tank or a buffer hopper. It has a substantially smaller storage capacity than the conventional seed hopper of a conventional planter row unit. Otherwise, to persons skilled in the art, the opener 99, gauge wheels 98 and closure arrangement 100 are known in the art. The push-type row unit 92 may be similar and need not be described in further detail. Moreover, the present invention may be adapted to grain drills, as well, using conventional furrow openers, depth gauge wheels and closers. In such cases the planting unit need not have the meter or buffer tank mounted to the ground-engaging tools. As used herein, the term "planting unit" is intended to broadly refer to all such devices as well as any other planting ground-engaging devices for opening and closing seed furrows.

Using the present invention, a grain drill could be constructed with the seed meters located at a high point in the tank, above the bottom. The lift augers would bring the seed up to the meters and evenly distribute the seed to all openers. The delivery hoses would extend to the openers form a position along the bottom of the seed tank, and have enough length to flex with the movement of the opener device. Draining the system to change seed varieties or type could be done with the floor auger. The over-all machine height could be lowered and the function of the machine improved.

Figure 3:
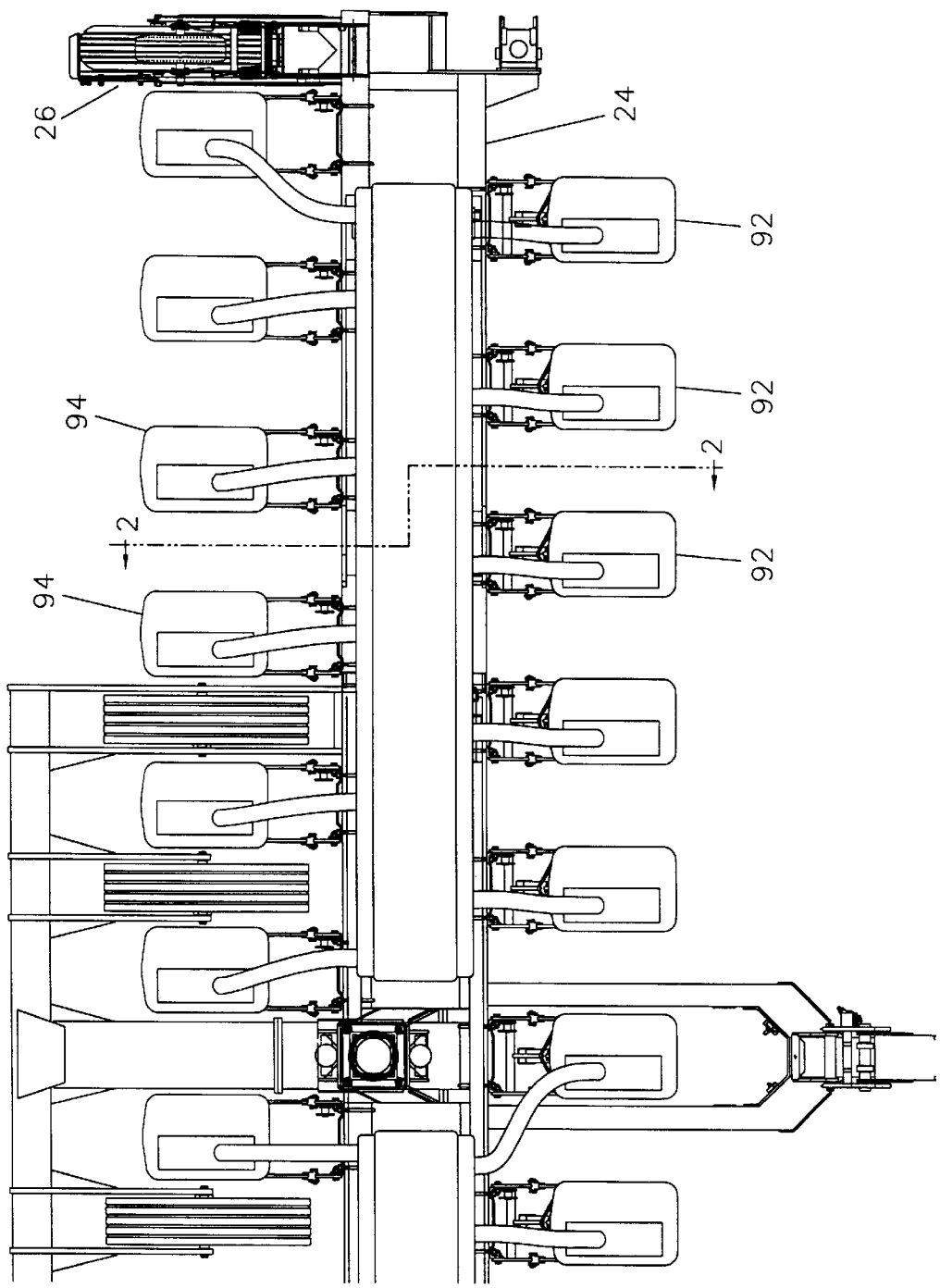
FIG. 3 is a plan view of the left wing section and a portion of the center section of the planter of FIG. 1.

Referring now to FIG. 3, the push-type row units 92 are seen to be spaced at equal increments, as are the pull-type row units 94. The push-type row units are located midway between the two pull-type row units located to the rear so that the lateral spacing between each row unit is the same across the width of the entire planter. As is known in the art, when it is desired to plant corn, typically only the rear row units 94 are used, and a typical row spacing for corn may be thirty inches between adjacent rows. When it is desired to plant soybeans, both the forward row units 92 and the rearward row units 94 are used to plant, so that the spacing between adjacent rows for soybeans is fifteen inches.

Returning, then, to FIG. 2, seed is fed under gravity from the seed storage tank 36 by means of a flexible hose 105 connected to the seed box overhangs to the rear or pull-type row unit 94, and by means of a second flexible hose 106 to the front push-type row unit 92. It will be observed from FIG. 2 that the vertical drop in the hoses 105, 106 is substantial and this is considered an important feature because it permits the seed to be fed from the storage tank to the individual row units under gravity (i.e., without additional conveying mechanism). Moreover, in order to accommodate the independent vertical motion of the individual row units (permitted by the four bar linkages mounting the row units to their associated toolbars and the hinged connection between the center section and wing section frames), the hoses 105, 106 are flexible so that they may extend or compress as well as move laterally. It will be observed that the seed inputs to the forward row units are spaced approximately the same distance from the associated seed outlet of the seed storage tank as the seed inlet of the rear row unit is spaced from its associated seed outlet of the seed storage tank. This symmetry is further considered important for reasons which will be apparent, but including the fact that the travel distances for seed for both forward and rear delivery tubes 105, 106 are approximately equal, yet both conduits permit independent vertical motion of their associated planter row units.

Figure 14:
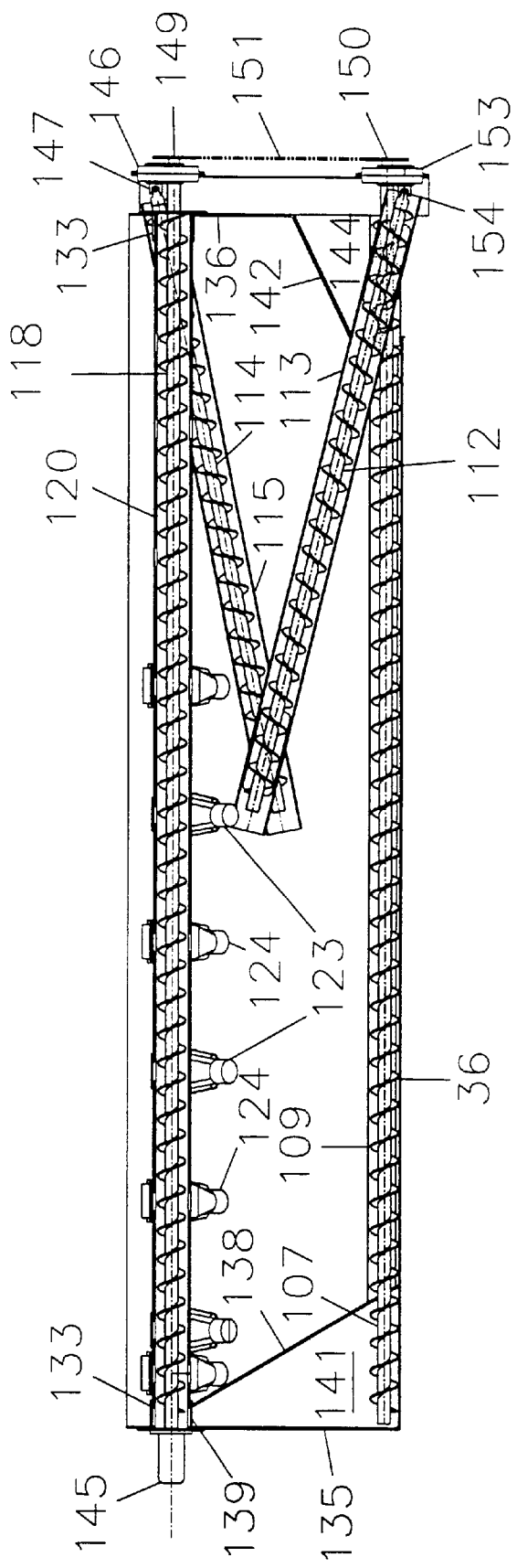
FIG. 14 is a longitudinal, vertical rear cross-sectional view of the right seed storage tank with the auger conveyor housings and distribution manifold also in vertical section.

Turning now to FIG. 14, the interior of an individual seed storage tank is seen. The view of FIG. 14 can be considered to be a vertical cross section of the left side tank 36, as viewed from the front, or it may be considered to be a vertical rear view of the right side of the storage tank 55 since they are mirror images of one another. For purposes of description, it will be assumed that the view of FIG. 14 is a front view of the left seed storage tank 36. Located at the bottom of the storage tank is an elongated floor auger 107 which extends substantially the entire length of the storage tank. The auger 107 may be a brush auger—that is, the auger flight is made of bristles, not metal or other solid material in order to reduce breakage or chipping of the seed. Alternative forms of conveyors may also be used, as persons skilled in the art will appreciate. The lower portion or wall of the seed storage tank has a uniform radius as at 108 in FIG. 11, and this radius conforms to the radius of the periphery of the flights of the auger 107 so that the seed storage tank may be substantially clean when it is run out of seed, and otherwise promote efficient movement of the seed within the storage tank. Moreover, adjacent the lower radiused portion 108, the bottom wall of the storage tank is sloped inwardly, both front and rear, to further assist in the delivery of seed to the auger under gravity.

Above the floor auger 107 is a plate 109 which also is curved similar to the radius at 108 to promote efficient conveyance of the seed. However, the edges of the top wall 109 are spaced from the sloped front and rear walls 108a of the bottom wall to permit seed to fall between the sloped walls 108a and the edges of plate 109 as the auger empties. As persons skilled in the art know, an auger of this type will draw substantially all of the seed at the input end (to the left in FIG. 14) as long as there is seed in the tank covering the auger and the speed of the auger is proper.

The lower feed auger 109 delivers seed to an elevator auger 112 which is housed within a tube 113, and is inclined upwardly and toward the center of the seed tank at a inclination of approximately fifteen degrees above the horizontal. The elevator auger 112 delivers seed to a second elevator auger designated 114 housed within a tube 115. The auger 114 delivers seed upwardly into the right to the input of a fourth or distribution auger conveyor 118 which is housed within a distribution manifold 120. The distribution manifold 120 extends horizontally across the upper portion of the seed storage tank 36 toward the center of the planter.

Spaced along the length of the distribution manifold 120 are a series of discharge manifolds, including forwardly inclined discharge manifolds generally designated 123 and rearwardly inclined discharge manifolds such as those designated 124. The forward discharge manifolds 123, as best seen in FIG. 11, extend downwardly and forwardly to discharge seed into the forward flexible hoses 106, and the rear discharge manifolds 124 extend downwardly and rearwardly to feed seed into the rear flexible tubular conduits 105 feeding the rear row units 94.

Referring now to FIG. 12, each of the discharge manifolds 123, 124 are similar, thus, only one needs to be described in further detail. The discharge manifold 123 includes an upper section 126 and a lower section 127 which have mating flanges for assembling them together by conventional fasteners. The upper and lower sections 126, 127 fit around and seal with the cylindrical distribution manifold 120, but the distribution manifold may be rotated within the discharge manifolds 124, as will be described. The lower, discharge portions of the discharge manifold 123 come together to form a tubular collar 128 which is provided with a steel nipple 129 to which an associated conduit 105 or 106 is attached by means of a conventional hose clamp. It will be observed from FIG. 2, for example, that the lid 104 of the buffer hopper 103 of the rear row unit 94 is also provided with a forwardly extending nipple 131 to which the bottom end of the hose 105 is attached. The lid 104 is further provided with a rear nipple 132, which may be closed with a transparent cover so that the interior of the hopper may be viewed if desired. As can be seen in FIG. 2, the lid of the buffer hopper of the forward rear unit 92 is similar in structure to the lid 104, having a forward nipple 131a and a rear nipple 132a. However, in this case, the discharge hose 106 is fitted to the rear nipple 132a, and the forward nipple 131a is provided with a transparent closure for inspection purposes.

Figure 15:
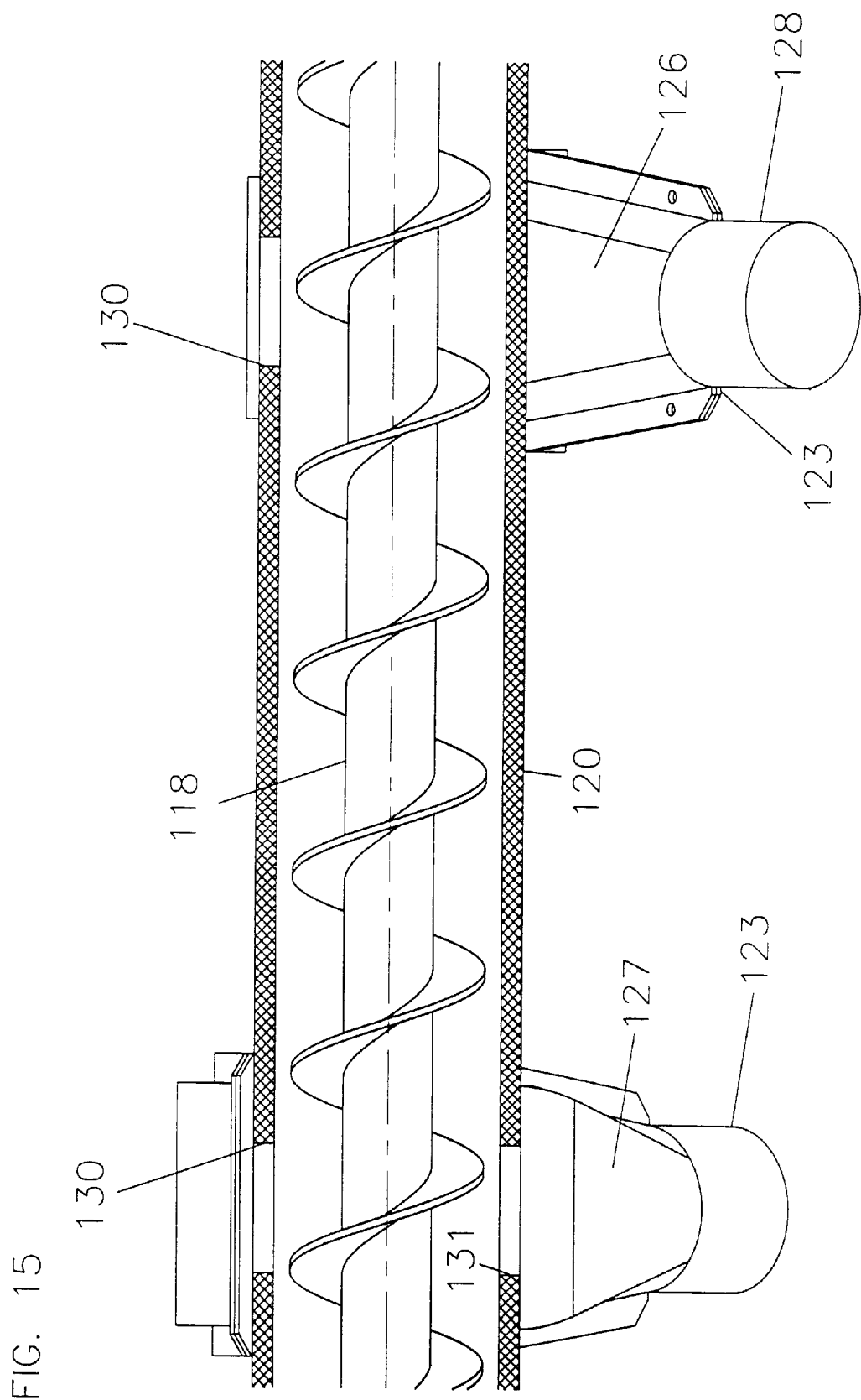
FIG. 15 is a vertical, cross-sectional view of a portion of the distribution auger taken parallel to the axis of the distribution manifold and with the distribution manifold rotated to the position for distributing only to the rear row units.
Figure 16:
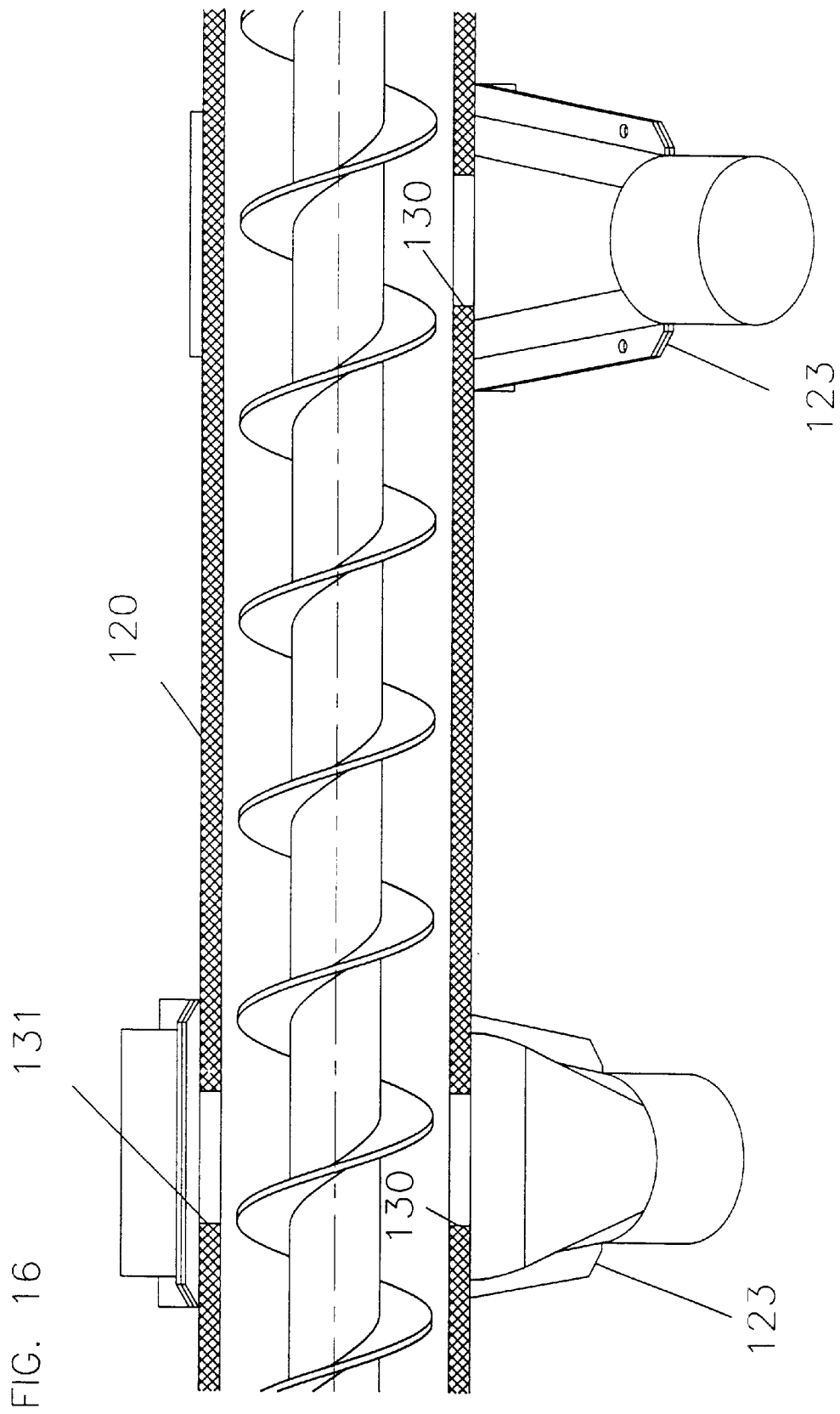
FIG. 16 is a longitudinal, vertical cross-sectional view of the distribution manifold similar to FIG. 15, but with the distribution manifold rotated to distribute seed to both the front row units and the rear row units.

Turning now to FIG. 15, the distribution manifold 120 has formed in it, along one longitudinal line parallel to the axis of rotation of the auger, a series of discharge openings 130 which are spaced at approximately fifteen inch intervals and which supply both front and rear row units. On the diagonally opposite side of the cylindrical discharge manifold 120, that is, along a line also parallel to the axis of rotation of the auger, are a series of discharge openings such that at designated 131 which are spaced at thirty inch intervals and which are designed to supply only the discharge manifolds associated with the rear row units. The ends of the distribution manifold 120 are received in cylindrical cup-shaped receptacles or bushings designated 133 in FIG. 14. The bushings 133 are mounted to the respective end walls, 135, 136 of the seed tank, and they support the distribution manifold 120. The distribution manifold 120 may be thus rotated between the position shown in FIG. 15, wherein seed is provided only to the rearwardly extending discharge manifolds 123, and the position of FIG. 16 wherein the more closely spaced apertures 130 are aligned with the discharge manifolds so that both front and rear end units are provided with seed continuously.

Still referring to FIG. 14, an inclined isolation baffle 138 extends from an upper overflow opening 139 at the discharge end of the distribution manifold, downwardly and inwardly to join with the left end of the cover plate 109 of the floor auger 107. The baffle 138, together with the end wall 135 and side and bottom walls of the tank form a transition region 141, the purpose of which will be described presently. Similarly, an incline wall or baffle 142 cooperates with the end wall 136 and the forward and rear walls and bottom of the storage tank 36 to form a second transition region 144.

Turning now to the drive for the augers within the seed storage tank, a hydraulic motor 145 is mounted to the inner wall 135 of the storage tank 36, and it drives the shaft of the distribution auger 118 directly. The shaft of the distribution auger 118 extends through the outboard sidewall 136 into an upper gear box 146 which includes an output spur gear driving a U-joint 147 coupled to the shaft of the upper elevator auger 114.

The shaft of the distribution auger 118 extends through the gear box 146 and drives a sprocket 149 which, in turn, drives a lower sprocket 150 by means of a chain 151. The sprocket 150 is mounted on the shaft of the floor auger 107 which extends through a lower gear box 153. An output spur gear of the gear box 153 drives the lower elevator auger 112 by means of a U-joint 154.

In operation, when all of the augers are driven as just described, seed within the storage tank is fed to the left end of the floor auger 107. Originally, the seed falls in the spaces to either side of the cover plate 109 and enters the auger at the left side just inside of the inclined baffle 138. Eventually, the floor auger fills with seed and seed is delivered into the transition region 144 where it is then feed into the first elevator auger 112. The first elevator auger 112 delivers seed to an aperture in the tube 113 which is aligned with a corresponding aperture in the tube 115 of the upper elevator auger. Seed is thus fed in the upper elevator auger 114 to the right end (again through a pair of communicating, aligned openings in tubes 115, 120) into the distribution manifold where it is conveyed to the discharge manifolds 123, 124 from right to left. Each discharge manifold feeds its associated flexible conduit and buffer hopper or planting device. When one becomes full, the seed is then communicated to the next discharge manifold for which one of the discharge openings 130, 131, as described above, is aligned. When all of the discharge manifolds, connecting conduit and buffer hoppers are full, seed is conveyed to the left end of the discharge manifold 120 where it is deposited through the overflow aperture under gravity to the left end of the floor auger 107. The transition 141 isolates this overflow seed from the main body of seed in the remainder of the storage tank, the overflow seed being fed directly to the input of the floor auger 107.

Thus, the seed continues to be re-circulated; and as seed is planted, it is replenished immediately. This recirculating distribution system obviates the need for measuring the flow of seed in a distribution system for each seed tank because seed in the associated floor auger is immediately replenished as long as there is seed in the storage tank. Moreover, as mentioned, the floor auger feeds seed from the input end as long as it is surrounded by seed. As the supply of seed diminishes within the main storage area of the tank 36 (that is inboard to outboard), the remainder of the seed will be in the outboard area of the storage tank and be fed around the sides of plate 109. This adds ballast to the wing sections where ballast is better applied. In other words, there is already sufficient weight on the center section due to the weight of the axle assembly and the lift mechanism as well as the weight of the tongue. However, when the planter is used in hard-packed ground, additional weight on the wing sections is useful to facilitate forming a furrow.

Figure 17:
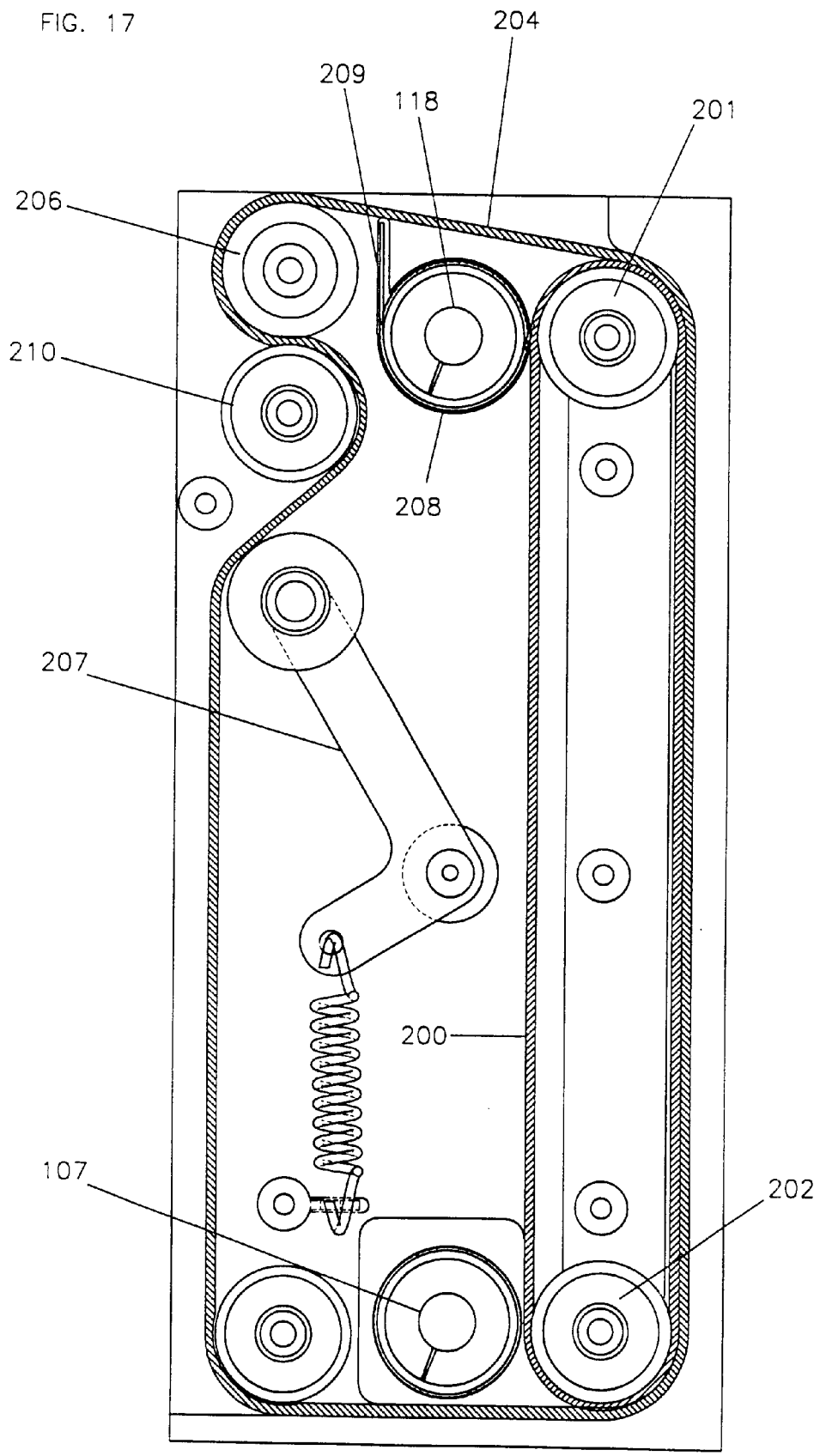
FIG. 17 is an end view of an alternate belt elevator for raising seed from the floor auger to the upper distribution conveyor.

Turning now to FIG. 17, there is shown an alternate elevator for raising seed from the floor auger. A first, continuous conveyor belt 200 is entrained about upper and lower rollers 201, 202. A second continuous conveyor belt 204 is entrained about various rollers, including a take-up reel, and its inner surface is in driving contact with the outer surface of the inner belt 200. The two belts are in side-by-side adjacent contact between the rollers 202 and 201, traveling in a vertical direction.

The Lower Feed Auger delivers seed through an aperture at the bottom of the endwall 136 of the seed tank. The seed is deposited onto the inner surface of the outer belt 204 along a horizontal stretch extending beneath the lower feed auger 107. The seed is conveyed to the nip point between the two conveyor belts 200, 204 which is formed at the bottom of roller 202. The seed is then moved upwardly, secured between the two belts, with adjacent surfaces in opposing relation, and delivered to the input of the upper conveyor top auger 118 where the inner belt diverges from the outer belt and returns about the upper roller 201. A trough 208 is carried by the end wall of the hopper. Trough 208 has a curved portion below the input end of the upper distribution auger 118 to catch and hold seed from the belt elevator to feed auger 118, and a vertical wall 209 to the left of auger 118 to assist in delivering seed to the auger. The outer belt is driven by roller 206, and it, in turn drives the inner belt. Roller 206 is driven by a conventional hydraulic motor. Belt 204 is pinched between drive roller 206 and idler 210. A spring loaded belt tensioning device 207 is included to maintain proper tension on drive belt 204.

Having thus disclosed in detail an illustrated embodiment of the invention, persons skilled in the art will be able to modify certain of the structure which has been disclosed and substitute equivalent elements for those depicted while continuing to practice the principle of the invention. It is, therefore, intended that all such modifications and substitutions be covered as they are embraced within the spirit and scope of the appended claims.

What is claimed is:

1. Seed distribution apparatus for an agricultural planting machine having an elongated frame extending transverse of a direction of travel, comprising:
   a plurality of seeding units mounted in spaced relation along said frame;
   an elongated seed storage tank mounted above said frame and extending laterally of said frame;
   a distribution conveyor at an upper portion of said tank and extending longitudinally of said tank;
   an elevator feeding seed from the bottom of said tank to said distribution conveyor; and
   a flexible conduit for each of said seeding units routing seed under gravity from said distribution conveyor to an associated seeding unit.

2. The apparatus of claim 1 wherein said distribution conveyor comprises an elongated tubular distribution manifold extending longitudinally of said tank substantially the entire length thereof and a conveying mechanism within said distribution manifold for transporting seed longitudinally of said distribution manifold, each of said flexible conduits being coupled to receive seed from said distribution manifold at a different lateral spacing along said distribution manifold, said distribution manifold having a seed input end and a seed outlet end, excess seed not delivered to said flexible conduits being expelled from said outlet end of said distribution manifold and returned to a store of seed within said tank.

3. The apparatus of claim 2 further including a discharge manifold associated with each of said seeding units coupled to said distribution manifold at one end and coupled to an associated one of said flexible conduits at another end; said distribution manifold being a cylindrical tube.

4. The apparatus of claim 3 wherein said seeding units are planter row units, each row unit including a buffer hopper coupled to an associated flexible conduit; and wherein said apparatus includes a first plurality of said row units mounted to the front of said frame to be pushed by said frame and a second plurality of row units mounted to the rear of said frame to be pulled by said frame in use, and wherein said flexible conduits include a first plurality of flexible conduits coupled to said distribution manifold for feeding rear-mounted row units and a second plurality of conduits for feeding forward-mounted row units; and wherein said distribution manifold is mounted for rotation about an axis and within said discharge manifolds, said distribution manifold including a first plurality of openings communicating only with said first plurality of flexible conduits when said distribution manifold is rotated to a first position, and a second plurality of openings communicating with said first and second pluralities of flexible conduits when said distribution manifold is rotated to a second position.

5. The apparatus of claim 3 wherein said seeding units includes a first plurality of seeding units mounted to the front of said frame to be pushed by said frame; and a second plurality of seeding units mounted to the rear of said frame to be pulled by said frame in use, wherein said flexible conduits include a first plurality of flexible conduits coupled to supply seed to said first plurality of seeding units, and a second plurality of flexible conduits coupled to provide seed to said second plurality of seeding units.

6. The apparatus of claim 5 wherein said tubular member of said distribution manifold is rotatably mounted within said tank, said tubular member including a first plurality of apertures for feeding seed from said distribution manifold to both said first plurality of seeding units and said second plurality of rear-mounted seeding units, and wherein said tubular distribution manifold includes a second plurality of apertures for feeding seed only to one of said first plurality of seeding units and said second plurality of seeding units, whereby said tubular distribution manifold may be rotated between a first position to provide seed to said forward-mounted and said rear-mounted seeding units, and a second position to provide seed to only one of said plurality of seeding units.

7. The apparatus of claim 5 wherein said tubular manifold comprises a cylindrical wall rotatable about an axis and having openings adapted to communicate respectively with associated ones of said discharge conduits, whereby when said wall is rotated to a first position, the openings thereof align with associated discharge conduits to permit seed to flow under gravity to associated seeding units, and when said tubular member is rotated to a second position, said cylindrical wall thereof aligns with associated discharge conduits to prevent seed from flowing from said tubular member to said predetermined discharge conduits, thereby permitting an operator to selectively inhibit individual planting units from receiving seed from said tank.

8. The apparatus of claim 2 further including a second conveyor located below said distribution conveyor conveying seed within the bottom of said tank to one end thereof;

an elevator for moving seed from said second conveyor upwardly to said distribution conveyor, whereby seed is recirculated through said tank and all of said discharge manifolds in the open position receive seed from said distribution manifold as long as seed is available within said tank.

9. The apparatus of claim 1 wherein said elongated seed tank comprises a unitary tank having an open top for loading seed into said tank;

a cover for covering said opening; and characterized in that said tank extends from an outboard end of said planter frame substantially to the center of said planter frame.

10. The apparatus of claim 9 wherein said tank further comprises a metal band supporting upright walls of said tank and coupled to said frame for support.

11. The apparatus of claim 1 wherein said frame comprises;

a center section frame supported by wheels;

a first wing section frame hinged to a first outboard end of said center section frame;

a second wing section frame hinged to a second outboard end of said center section frame;

wherein named seed tank extends from a position approximately at the middle of said center section frame continuously to a position adjacent said outboard end of said first wing section frame; and further comprising a second elongated seed storage tank mounted above said frame and extending laterally from approximately the center of said center section frame to an outboard end of said second wing section frame.

12. In an agricultural planter having an articulated frame including a center section frame and at least one wing section frame hinged to said center section frame for pivotal motion in a vertical direction, the improvement comprising:

an elongated seed tank extending laterally from a location adjacent an outboard end of said wing section frame to a location above said center section frame thereby to extend over and be carried by both said wing section frame and said center section frame;

a first link supporting an outboard end of said tank, said link having a first end pivotally coupled to said tank and a second end pivotally coupled to said wing section frame;

a support member coupled to said tank at an intermediate location and engaging said frame whereby as said wing section lowers to follow ground contour, said tank pivots about said support member such that the outboard end of said tank lowers and the inboard end of said tank rises and is supported by said center section frame.

13. The apparatus of claim 12 further comprising a second link having a first end pivotally coupled to said tank and a second end pivotally coupled to said articulated frame and arranged to limit lateral movement of said tank as it is tilted as its associated wing section raises and lowers to follow ground contour.

14. The apparatus of claim 13 wherein said articulated frame further comprises a second wing section frame hinged to said center section frame, said apparatus further comprising:

a second elongated seed tank extending laterally from a location adjacent an outboard end of said second wing section frame to a location above said center section frame;

a third link supporting an outboard end of said second tank, said third link having a first end pivotally coupled to said second tank and a second end pivotally coupled to said second wing section frame;

a fourth link having a first end pivotally coupled to said tank and a second end pivotally coupled to said articulated frame to resist lateral motion of said second tank; and a second support member coupled to said second tank and engaging one of said center section frame and second wing section frame.

15. The apparatus of claim 12 further comprising a second support member coupled to said first tank at a location outboard of said first support member, said first and second support members constructed and arranged such that when said first wing section frame rotates downwardly relative to said center section frame to follow ground contour, said first named tank is supported by said first support member, and when said first wing section frame is elevated in response to a higher ground contour than said center section frame, an inboard end of said first named tank is supported by said second support member.

16. The apparatus of claim 12 wherein said wing section frame comprises a right wing section frame hinged to said center section frame for pivotal motion in a vertical direction;

and said apparatus further includes a left wing section frame hinged to said center section frame for independent pivotal motion in a vertical direction;

a second seed tank carried by said left wing section frame and said center section frame; and each of said seed tanks extending from a location adjacent respective outboard ends of said left and right wing section frames to respective locations adjacent the center of said center section frame, whereby each seed tank straddles its associated hinge connection to said center section frame, each tank being pivotally supported at an outboard end to its associated wing section and pivotally supported at an intermediate location adjacent the center of said center frame section.

17. The apparatus of claim 12 wherein the pivotal support of the inboard end of said tank comprises a cylindrical pivot member resting on said center section frame when said wing section frame is level, said apparatus further including a second link pivotally connected at an inboard and to said tank and at an outboard end to said wing section frame, said second link being located in a generally horizontal disposition to resist lateral movement of said tank as the outboard end of the associated tank raises and lowers in response to changing ground contour.

18. The apparatus of claim 12 wherein said support member is a pivot member engaging said center section frame when said wing section frame is lowered relative to said center section frame.

19. An agricultural seed planter comprising an elongated frame extending transverse of the direction of travel;

a first plurality of seeding units mounted behind said frame in laterally spaced relation for independent vertical movement in a response to ground contour charges;

a second plurality of seeding units mounted in front of said frame in laterally spaced relation for independent vertical movement;

an elongated seed tank carried by said frame and having an elongated upper opening to receive seed in bulk form;

a distribution manifold within said tank and extending therealong;

a conveyor moving seed from within said tank through said distribution manifold;

a first plurality of flexible conduits, each conduit of said first plurality coupled to said distribution manifold at one end to receive seed and coupled to an associated one of said first plurality of seeding units at another end to deliver seed to said first plurality of seeding units; and a second plurality of flexible conduits, each conduit of said second plurality coupled to said distribution manifold at one end to receive seed and coupled to an associated one of said second plurality of seeding units at another end to deliver seed to said second plurality of seeding units.

20. In an agricultural planter, the combination comprising:

a frame;

a plurality of seeding units spaced laterally along said frame;

an elongated seed storage tank carried by said frame and having first and second ends spaced apart transverse of a direction of travel for said planter;

a first conveyor at a base of said tank conveying seed along a first lateral direction;

elevator receiving seed from said first conveyor and elevating seed to an upper portion of said tank;

a second conveyor in the upper portion of said tank receiving seed from said elevator and conveying seed along a second lateral direction opposite said first lateral direction; and a plurality of flexible conduits spaced along said second conveyor, each conduit communicating seed from said second conveyor under gravity to an associated seeding unit.

21. Apparatus for distributing seed in an agricultural planter comprising: a frame extending transverse of a direction of travel of said planter;

a first plurality of ground-engaging seeding units mounted in front of said frame to be pushed in field operation;

a second plurality of ground-engaging seeding units mounted behind said frame to be pulled in field operation;

at least one seed storage tank carried by said frame and extending longitudinally thereof;

a first plurality of flexible conduits, each coupling seed under gravity from said tank to one of said planting units mounted in front of said frame;

a second plurality of flexible conduits, each coupling seed under gravity from said tank to one of said planting units mounted behind said frame; and a conveyor moving seed laterally within said tank to supply seed to each of said flexible conduits.

22. The apparatus of claim 21 wherein said seed storage tank includes a lower depending portion and an upper extending portion providing an overhang, said flexible conduits having an upper end coupled to said overhang to receive seed therefrom whereby the length of said flexible conduits is sufficient to permit seed meters to be mounted adjacent said overhang or to said seeding units.

23. In an agncultural planter having a frame, and a plurality of planter row units mounted to said frame, said frame including forward and rear upright support structures;

a seed storage tank characterized as having substantially an unobstructed top opening, a lower depending portion received between said forward and rear support structures and carried by said support structures, and an upper overhang portion extending above one of said upright support structures and providing a downwardly facing wall; and a plurality of flexible conduits extending from said upper overhang portion of said tank downward to associated planter row units to supply seed thereto.

24. The apparatus of claim 23 wherein said seed tank includes an upper distribution conveyor moving seed laterally substantially the entire length of said tank; an elevator moving seed from a bottom of said tank up to said distribution conveyor; and a lower conveyor moving seed in the bottom of said tank to said elevator, whereby seed within said tank is circulated within said tank and characterized in that said conduits are supplied with seed from said tank as long as seed remains in the bottom of said tank.

25. The apparatus of claim 24 wherein said tank extends from a lateral end of said from to an inboard location adjacent the center of said frame and characterized in that seed conveyed by said distribution conveyor which is not delivered to said flexible conduits is returned at an outlet end to said tank, said apparatus further including a baffle in said tank located to provide a transition region for seed adjacent an input of said lower conveyor located adjacent an inboard end thereof, whereby seed is first supplied from an inboard end of said tank thereby to maintain seed weight at an outboard end of said tank until the seed supply is exhausted.

* * * * *